United States Patent
Sakamoto et al.

(10) Patent No.: US 10,191,751 B2
(45) Date of Patent: Jan. 29, 2019

(54) INFORMATION PROCESSING DEVICE FOR GENERATING APPLICATION PROGRAMMING INTERFACE INFORMATION

(71) Applicant: FUJITSU LIMITED, Kawasaki-shi, Kanagawa (JP)

(72) Inventors: Takuya Sakamoto, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/275,966

(22) Filed: Sep. 26, 2016

(65) Prior Publication Data

US 2017/0090950 A1   Mar. 30, 2017

(30) Foreign Application Priority Data

Sep. 30, 2015  (JP) ................................ 2015-194437

(51) Int. Cl.
| | |
|---|---|
| G06F 1/00 | (2006.01) |
| G06F 9/4401 | (2018.01) |
| G06F 13/10 | (2006.01) |
| G06F 17/30 | (2006.01) |
| H04L 29/08 | (2006.01) |

(52) U.S. Cl.
CPC ............ G06F 9/4411 (2013.01); G06F 9/441 (2013.01); G06F 13/102 (2013.01); G06F 17/30896 (2013.01); H04L 67/025 (2013.01)

(58) Field of Classification Search
USPC .................................... 710/8, 10, 11, 13, 16
See application file for complete search history.

(56) References Cited

U.S. PATENT DOCUMENTS

| | | | |
|---|---|---|---|
| 6,195,694 B1 | 2/2001 | Chen et al. | |
| 9,307,342 B2 * | 4/2016 | Sojoodi | ................... H04L 67/02 |
| | (Continued) | | |

FOREIGN PATENT DOCUMENTS

| | | |
|---|---|---|
| EP | 2550790 | 1/2013 |
| EP | 2913751 | 9/2015 |
| | (Continued) | |

OTHER PUBLICATIONS

EESR—The Extended European Search Report dated Feb. 7, 2017 for corresponding European Patent Application No. 16191177.1.

*Primary Examiner* — Raymond N Phan

(74) *Attorney, Agent, or Firm* — Fujitsu Patent Center

(57) ABSTRACT

An information processing device including: a memory, and a processor coupled to the memory and the processor configured to: execute an application software, execute a specified process for coordinating a software module described in a first language with a software module described in a second language that is different from the first language, and load a device driver for the application software using a peripheral device, the device driver including a first software module described in the first language and a second software module described in the second language, the first software module being a software module in which a plurality of first interfaces are defined, the second software module being a software module in which a plurality of second interfaces are defined, the plurality of first interfaces being associated with the plurality of second interfaces respectively.

11 Claims, 17 Drawing Sheets

(56) References Cited

U.S. PATENT DOCUMENTS

| | | |
|---|---|---|
| 2005/0109831 A1 | 5/2005 | Obara et al. |
| 2007/0101342 A1 | 5/2007 | Flegg et al. |
| 2013/0326533 A1 | 12/2013 | Ito et al. |
| 2015/0248360 A1* | 9/2015 | Ito .................. G06F 13/102 710/8 |

FOREIGN PATENT DOCUMENTS

| | | |
|---|---|---|
| JP | 2000-510626 A | 8/2000 |
| JP | 2005-157427 A | 6/2005 |
| JP | 2013-250739 A | 12/2013 |
| JP | 2015-162214 A | 9/2015 |

* cited by examiner

FIG. 3

| TYPE | SERVICE UUID |
|---|---|
| SPHYGMOMANOMETER | 0x1810 |
| CLINICAL THERMOMETER | 0x1809 |
| WEIGHT SCALE | 0x181D |

FIG. 4

| SERVICE UUID | DEVICE ID | URL |
|---|---|---|
| 0x1810 | 0x12340001 | http://jp.fujitusu.com/driver/blood_pressure |
| 0x1810 | 0x23451234 | http://example.com/driver/body_temperature |
| 0x1809 | 0x12340002 | http://jp.fujitusu.com/driver/body_temperature |
| 0x181D | 0x12340003 | http://jp.fujitusu.com/driver/weight_scale |

FIG. 5

```
JavaScript PART
this.device.loadNative("driver.jar", "http://jp.fujitsu.com/driver/
blood_pressure", function(){alert('loadNative ok');}, function()
{alert('loadNative not ok');});
```
30A

```
Java PART
DexClassLoader classLoader = new DexClassLoader(this.jarDir,
this.optDir, null, getClass().getClassLoader());
Class<?> driverClass = classLoader.loadClass(className);
Method methods[] = driverClass.getMethods();
```
30B

| CLASS NAME | METHOD NAME | CORRESPONDING JavaObject |
|---|---|---|
| com.fujitsu.jp.driver.BloodPressure | GetSystolic | [JavaObject] |
| com.fujitsu.jp.driver.BloodPressure | getDiastolic | [JavaObject] |

FIG. 11

| SERVICE UUID | DEVICE ID | API 1 (getSystolic) | API 2 (getDiastolic) |
|---|---|---|---|
| 0x1810 | 0x12340001 | getSystolic | getDiastolic |
| 0x1810 | 0x23451234 | getBloodPressureSystolic | getBloodPressureDiastolic |

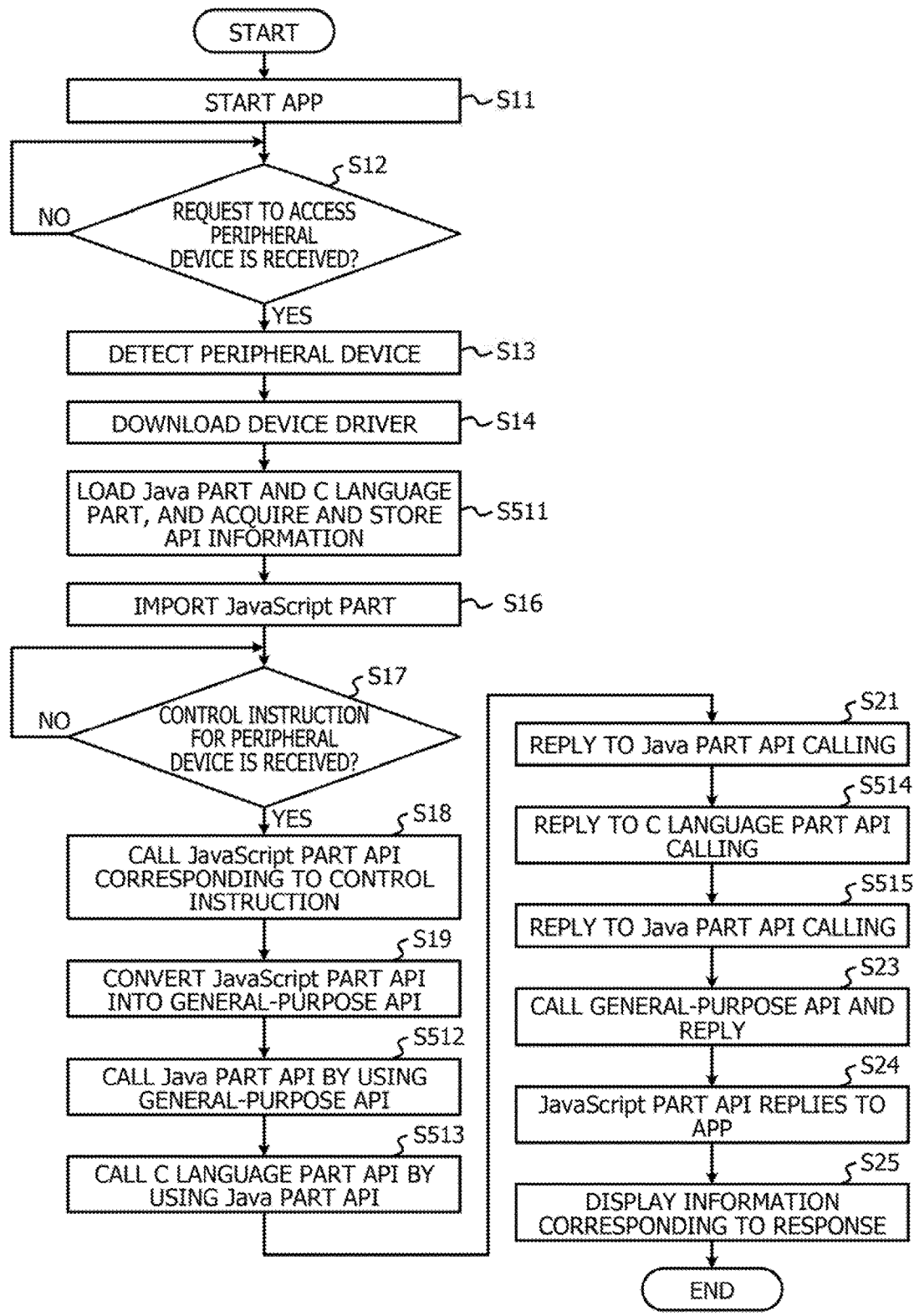

INFORMATION PROCESSING DEVICE FOR GENERATING APPLICATION PROGRAMMING INTERFACE INFORMATION

CROSS-REFERENCE TO RELATED APPLICATION

This application is based upon and claims the benefit of priority of the prior Japanese Patent Application No. 2015-194437, filed on Sep. 30, 2015, the entire contents of which are incorporated herein by reference.

FIELD

The disclosed technology is related to an information processing device, an information processing method, and an information processing program.

BACKGROUND

In recent years, realization of Internet of things (IoT) in which various devices and sensors are coupled to networks has been advanced. As a method for coupling these devices and sensors (hereinafter, also called "peripheral devices") to networks, there is a method for directly coupling to the Internet via mobile phone networks and so forth. In addition, as another method, there is a case of coupling via smart devices such as smartphones and tablets, carried around by persons.

In a case of considering trying to provide an application (hereinafter, also called an "app" as an abbreviation of "application") for coupling to, via a smart device, and using the peripheral devices, it is desirable to implement, in the app, communication protocols corresponding to these peripheral devices. In the communication protocols corresponding to the peripheral devices, there are parts specific to the respective devices. Therefore, in order to implement the communication protocols in the corresponding smart device, a device maker creates and provides an app to users in many cases. However, in this case, it is desirable to prepare an app for each of devices to be used, and it has a disadvantage for users.

Therefore, there is a method in which, in order to enable to access peripheral devices by using application programming interfaces (APIs), a device maker provides, to app developers, software modules in which parts specific to the respective peripheral devices are described. In, for example, the Device WebAPI Consortium, a method for creating device drivers in accordance with specifications of the consortium, thereby enabling an app to access devices via the WebAPI, is proposed and implemented.

In addition, as a form of an app provided in a smart device, there is a form called a hybrid app. The hybrid app is an app having, for example, a form in which both a web technology such as a hypertext markup language (HTML) or JavaScript (registered trademark) and a native language such as Java (registered trademark) or a C language are used. According to the hybrid app, a part desired to access APIs provided by an operating system (OS) is described by using the native language, and a part described by using the native language is accessed from the web technology. From this, it becomes possible to utilize the functions of the OS by using the web technology.

In other words, it is possible to describe, by using the native language, a part to access peripheral devices and to describe, by using the web technology, a large part of an app including user interfaces (UIs). In addition, from this, it becomes possible to use as one app on the smart device while not accessing the web technology by using a web browser. While a large number of web browsers are used in personal computers, the number of apps installed and used in smart devices is larger than the number of apps used via web browsers, in the smart devices. In view of such a background, there is important a form called the hybrid app, in which a developer, who has developed apps for web browsers by using a personal computer and who is acquainted with the web technology, is able to develop apps for smart devices.

Here, device drivers that access peripheral devices by using the above-mentioned APIs utilize the APIs provided by the OS. Therefore, it is desirable to describe the device drivers by using the native language. Since device drivers of a device to perform communication by using, for example, the Bluetooth (registered trademark) are desired to access APIs, related to the Bluetooth and provided by the OS, the device drivers are described by using the native language. Therefore, there is proposed a method for realizing, by using the native language, minimum functions used for accesses to devices and describing many portions of the device drivers by using the web technology. This method reduces an effort of creating an app to enable a terminal device to control an external device, the terminal device not being authorized to incorporate thereinto a device driver for control of the external device. Specifically, in this method, a general-purpose driver is preliminarily incorporated into the OS, and an application includes a driver library. The driver library is provided, by the application, with a first control instruction in a form recognizable by the application and converts the first control instruction into a second control instruction in a form able to be delivered to the external device. The general-purpose driver transmits, to the external device, the converted second control instruction output by the driver library.

CITATION LIST

Patent Literature

[Patent Literature 1] Japanese National Publication of International Patent Application No. 2000-510626
[Patent Literature 2] Japanese Laid-open Patent Publication No. 2005-157427
[Patent Literature 3] Japanese Laid-open Patent Publication No. 2013-250739
[Patent Literature 4] Japanese Laid-open Patent Publication No. 2015-162214

SUMMARY

According to an aspect of the invention, an information processing device includes a memory, and a processor coupled to the memory and the processor configured to: execute an application software, execute a specified process for coordinating a software module described in a first language with a software module described in a second language that is different from the first language, and load a device driver for the application software using a peripheral device, the device driver including a first software module described in the first language and a second software module described in the second language, the first software module being a software module in which a plurality of first interfaces are defined, the second software module being a software module in which a plurality of second interfaces are defined, the plurality of first interfaces being associated with the plurality of second interfaces respectively, wherein for using the peripheral device the application software is configured to make a first access to a first interface selected from the plurality of first interfaces, the first software module is configured to make a second access to the specified process based on the first access, the specified process is configured to make a third access to a second interface selected from the plurality of second interfaces based on the second access and associated with the selected first interface, the second software module is configured to make a fourth access to the peripheral device based on the third access.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a correspondence table between a type of peripheral device and a service UUID.

FIG. 4 is a diagram illustrating an example of a correspondence table between a service UUID, a device ID, and a URL.

FIG. 5 is a diagram illustrating an example of a device driver.

FIG. 6 is a diagram illustrating an example of an API table.

FIG. 11 is a diagram illustrating an example of an API correspondence table.

FIG. 17 is a flowchart illustrating an example of information processing in the fifth embodiment.

DESCRIPTION OF EMBODIMENTS

Along with the popularization of the IoT, various devices exist in the world. Accordingly, there may be assumed a way to use, such as carrying around only a terminal such as a smartphone, without carrying around a device, and using a device existing in the place. In the related art, since it is difficult to extend a general-purpose driver side, it is difficult to utilize a device with which a general-purpose driver is not able to deal. In addition, it is difficult to preliminarily create a general-purpose driver so as to be able to deal with a device likely to be used.

As one aspect, an object of the disclosed technology is to dynamically replace device drivers for using peripheral devices in a hybrid application.

Hereinafter, examples of embodiments of the disclosed technology will be described in detail with reference to drawings.

First Embodiment

Figure 1:
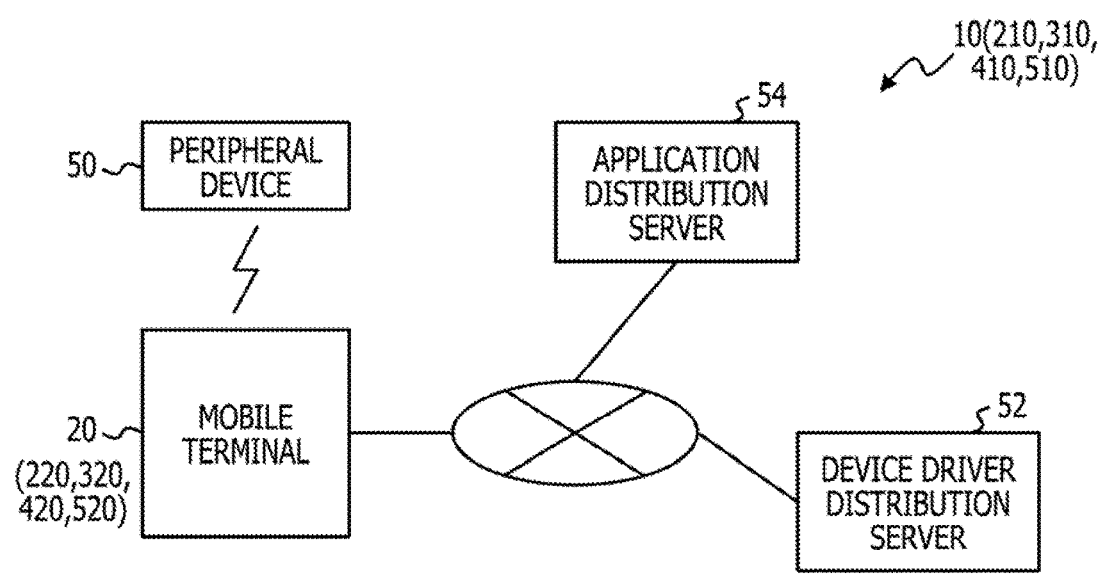
FIG. 1 is a block diagram illustrating a schematic configuration of an information processing system according to first to fifth embodiments.

As illustrated in FIG. 1, an information processing system 10 according to a first embodiment includes a mobile terminal 20, a peripheral device 50, a device driver distribution server 52, and an application (hereinafter, "application" is abbreviated as "app" in some cases) distribution server 54.

The mobile terminal 20 is an information processing device such as, for example, a smartphone or a tablet terminal. On the mobile terminal 20, an app to utilize the peripheral device 50 operates. In addition, while details will be described later, a case where the app to utilize the peripheral device 50 is a hybrid app to use both a web technology and a native language will be described in the present embodiment.

The peripheral device 50 is an instrument such as, for example, a printer, a card reader, or one of various kinds of sensors. The peripheral device 50 and the mobile terminal 20 are coupled to each other by wireless communication or wired communication. The peripheral device 50 and the mobile terminal 20 communicate with each other by using, for example, the Bluetooth (registered trademark) or a wireless local area network (LAN).

The device driver distribution server 52 is an information processing device such as a general server device and stores device drivers in an internally provided storage device or an externally coupled storage device. In accordance with a request from the mobile terminal 20, the device driver distribution server 52 distributes device drivers to the mobile terminal 20.

The app distribution server 54 is an information processing device such as a general server device and stores app programs in an internally provided storage device or an externally coupled storage device. In accordance with a request from the mobile terminal 20, the app distribution server 54 distributes app programs to the mobile terminal 20.

Each of the device driver distribution server 52 and the app distribution server 54 and the mobile terminal 20 are coupled to each other by wireless communication or wired communication. Each of the device driver distribution server 52 and the app distribution server 54 and the mobile terminal 20 communicate with each other by using, for example, a wireless LAN or a mobile network such as the 3G or the Long Term Evolution (LTE).

Figure 2:
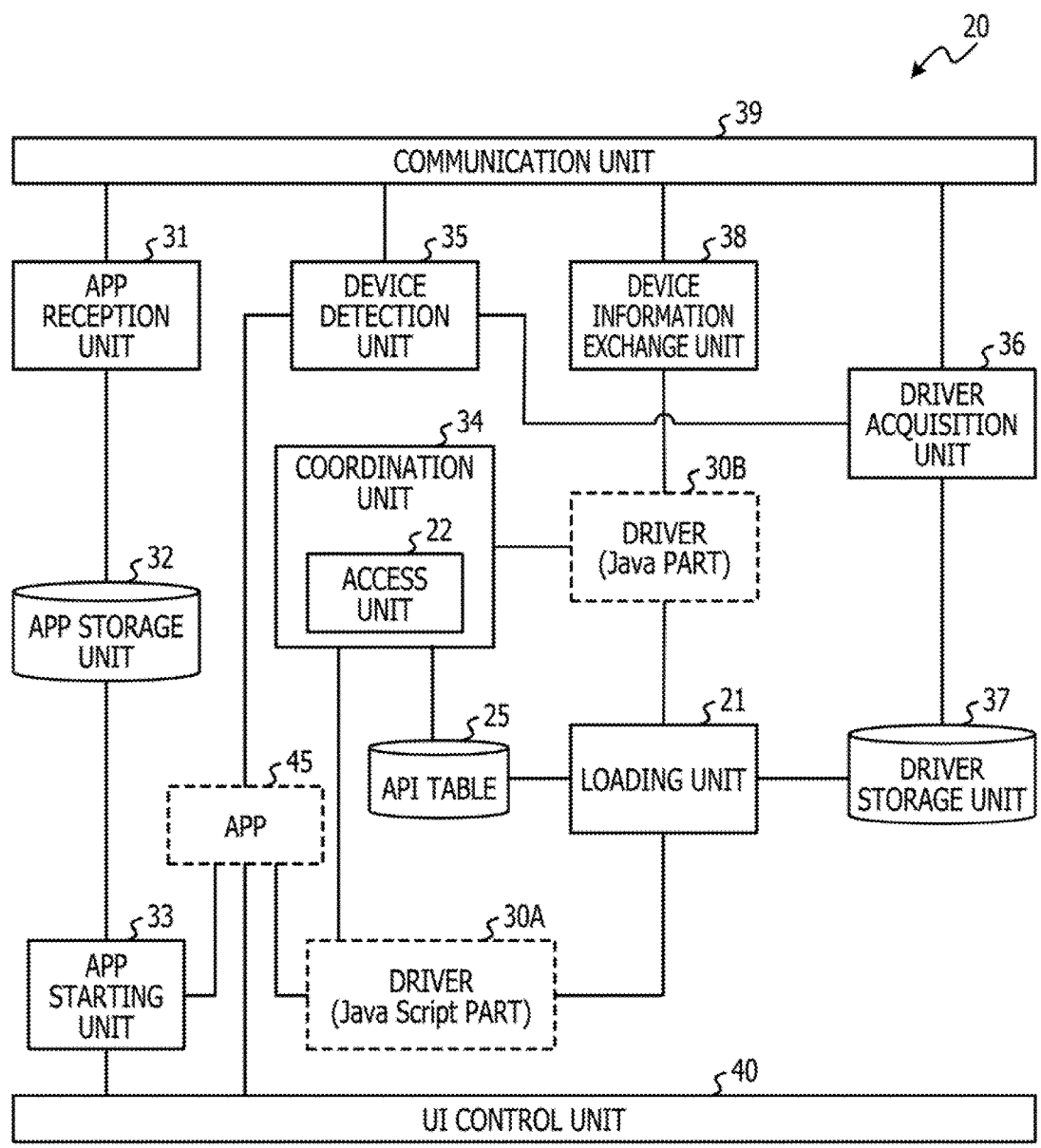
FIG. 2 is a functional block diagram illustrating a schematic configuration of a mobile terminal according to the first embodiment.

FIG. 2 illustrates a schematic configuration of the mobile terminal 20. The mobile terminal 20 functionally includes an app reception unit 31, an app starting unit 33, a device detection unit 35, a driver acquisition unit 36, and a device information exchange unit 38. In addition, the mobile terminal 20 includes a loading unit 21, a coordination unit 34, a communication unit 39, and a user interface (UI) control unit 40, the coordination unit 34 including an access unit 22. Furthermore, an app storage unit 32, a driver storage unit 37, and an application programming interface (API) table 25 are provided in a predetermined storage area of the mobile terminal 20. Hereinafter, the individual functional units of the mobile terminal 20 will be described.

The communication unit 39 controls communication between the mobile terminal 20 and the peripheral device 50 and communication between the mobile terminal 20 and each of the device driver distribution server 52 and the app distribution server 54.

The UI control unit 40 controls UIs to provide a unit for presenting information to a user and a unit for inputting information from the user. Specifically, the UI control unit 40 controls display of an icon for instructing to start an app, reception of an access request or a control instruction for the peripheral device 50, screen display based on information acquired from the peripheral device 50, and so forth.

The app reception unit 31 receives and stores an app program from the app distribution server 54 via the communication unit 39 and in the app storage unit 32.

The app starting unit 33 reads, from the app storage unit 32, an app program of an app instructed to be started by a user via the UI control unit 40 and starts an app 45. The user may touch, for example, an icon displayed in a display unit in the mobile terminal 20, thereby performing the instruction from the user.

As described above, in the present embodiment, the hybrid app is used as the app 45 to operate on the mobile terminal 20. The hybrid app is made up of a part described by using a web technology and a part described by using a native language. In a case where the mobile terminal 20 is equipped with, for example, an Android (registered trademark) operating system (OS), the hybrid app is able to utilize the Java (registered trademark) and to further utilize a C language, as the native language. In addition, the hybrid app is able to utilize a hypertext markup language (HTML), the JavaScript (registered trademark), cascading stylesheets (CSS), and so forth, which each serve as the web technology.

In addition, as a technology for realizing, in the hybrid app, coordination between the part described by using the web technology and the part described by using the native language, a framework called Apache Cordova is provided. The Apache Cordova is a platform including a JavaScript part and a Java part. In a case of using the Apache Cordova, an app developer is able to create one app by describing a web technology part and building, along therewith, a platform part of a Cordova plug-in to provide a native function, as a native part.

In a stage in which the app starting unit 33 starts the app 45 to utilize the peripheral device 50, a device driver is not yet read, and an execution environment on the mobile terminal 20 is configured by the app 45 and a runtime. Note that, in the present embodiment, the runtime is a part other than the app 45 or a device driver 30, supposed to be replaced, and includes the individual functional units of the mobile terminal 20 illustrated in FIG. 2.

The app 45 started by the app starting unit 33 outputs, to the device detection unit 35, an access request for the peripheral device 50, indicated by a user operation. Note that this access request includes information for specifying what kind of peripheral device 50 is intended to be accessed. In a case of an access request from, for example, an app to measure blood pressure, information for specifying a sphygmomanometer is included as the type of the peripheral device 50.

In addition, based on an operation performed by a user or an instruction from another process of the app 45, the app 45 started by the app starting unit 33 delivers, to a JavaScript part 30A to be described later, a control instruction for the peripheral device 50. Specifically, the app 45 calls an API of the JavaScript part 30A, which corresponds to the control instruction. In addition, the app 45 receives a response from the JavaScript part 30A, which corresponds to the API calling, and delivers the received response to the UI control unit 40.

Upon receiving the access request for the peripheral device 50, the device detection unit 35 detects the peripheral device 50 via the communication unit 39. The detection of the peripheral device 50 may be performed by scan processing compliant with a communication standard with the peripheral device 50. In a case of utilizing, for example, the Bluetooth (registered trademark) for communication with the peripheral device 50, the device detection unit 35 performs the scan processing compliant with the specification of the Bluetooth. In addition, in a case of utilizing a wireless LAN for communication with the peripheral device 50, the device detection unit 35 performs the scan processing compliant with the specification of the wireless LAN, by using, for example, universal plug and play (UPnP) or the like.

More specifically, in a case of utilizing, for example, the Bluetooth Low Energy (BLE) for communication between the mobile terminal 20 and the peripheral device 50, the device detection unit 35 receives advertising periodically transmitted by the peripheral device 50. The advertising includes the service universally unique identifier (UUID) and the device ID of the peripheral device 50 that transmits that advertising. The service UUID is identification information for the type of the peripheral device 50. The device ID is identification information for the peripheral device 50, independently set by a device vendor.

The device detection unit 35 holds, for example, such a correspondence table as illustrated in FIG. 3 between the type of the peripheral device 50 and the service UUID thereof and references the correspondence table at a time of detection of the peripheral device 50. In addition, the device detection unit 35 detects the peripheral device 50 that transmits the advertising including the service UUID corresponding to the type of the peripheral device 50 included in the access request from the app 45. The device detection unit 35 notifies the driver acquisition unit 36 of the service UUID and the device ID included in the advertising transmitted by the detected peripheral device 50.

The driver acquisition unit 36 requests, from the device driver distribution server 52 via the communication unit 39, a device driver to be used by the app 45 to utilize the peripheral device 50 indicated by the information given notice of by the device detection unit 35 and downloads the device driver. The driver acquisition unit 36 holds, for example, such a correspondence table as illustrated in FIG. 4 between a service UUID, a device ID, and a URL indicating an acquisition destination of a device driver for the peripheral device 50 identified by the service UUID and the device ID thereof. In addition, the driver acquisition unit 36 acquires, from the correspondence table, a URL corresponding to a service UUID and a device ID given notice of by the device detection unit 35 and accesses the device driver distribution server 52 and accesses the device driver distribution server 52, thereby download the corresponding device driver.

In the present embodiment, the device driver includes a module (first module) described by using a web technology and a module (second module) described by using a native language. Hereinafter, it is assumed that, as illustrated in FIG. 5, the device driver 30 including a JavaScript part 30A to serve as the first module and a Java part 30B to serve as the second module is downloaded, and the device driver 30 will be described.

Note that regarding the downloading of the device driver 30, the JavaScript part 30A and the Java part 30B may be separately downloaded or one file into which these are compressed may be downloaded. In addition, before the downloading of the device driver 30, an information file in which information of the device driver 30 is written may be downloaded. It is assumed that by accessing a URL acquired from, for example, the correspondence table illustrated in FIG. 4, an information file illustrated as follows is downloaded.

{"java_driver":"driver.jar","java_driver_class":"com.fujitsu.jp.driver. BloodPressure","js_driver":"driver.js"}

Based on this information file, it is found that a driver.jar file to serve as the Java part 30B and a driver.js file to serve as the JavaScript part 30A exist in the device driver 30. Note that the information file of the above-mentioned example includes a class name defined in the Java part 30B. This class name is described in the information file so as to be used in processing in a subsequent stage, and details thereof will be described later. Based on this information file and the URL from which this information file is downloaded, the driver acquisition unit 36 creates a URL for downloading a file of the Java part 30B and a file of the JavaSacript part 30A. In a case of already acquiring such an information file as described above regarding the device driver 30 corresponding to, for example, a service UUID=0x1810 and a device ID=0x12340001 in the correspondence table illustrated in FIG. 4, the driver acquisition unit 36 creates the following URL <URL for Java Part 30B>
http://jp.fujitsu.com/driver/blood_pressure/driver.jar
<URL for JavaScipt Part 30A>
http://jp.fujitsu.com/driver/blood_pressure/driver.js The driver acquisition unit 36 accesses the device driver distribution server 52 by using the created URL, thereby downloading the file of the Java part 30B and the file of the JavaScript part 30A. The driver acquisition unit 36 stores the downloaded device driver 30 in the driver storage unit 37. In addition, in a case of already downloading the information file, the driver acquisition unit 36 stores the information file in the driver storage unit 37.

The loading unit 21 loads the lava part 30B of the device driver 30 stored in the driver storage unit 37. In, for example, the Android OS, an API for reading a jar file serving as a class file of the Java is provided. By using that API, the loading unit 21 is able to load the Java part 30B.

In accordance with a Java object corresponding to an API called by the access unit 22 to be described later, the loaded Java part 30B notifies the device information exchange unit 38 of information for controlling the peripheral device 50. This processing is performed by calling an API of, for example, the Android OS. In addition, the loaded Java part 30B receives a response from the device information exchange unit 38, which corresponds to a control instruction, and replies to the coordination unit 34.

In addition, at a time of loading the Java part 30B, the loading unit 21 acquires information (hereinafter, called "API information") to be used to call an API defined in the Java part 30B and stores the information in the API table 25. In order to access a Java object for controlling the peripheral device 50, it is desirable to call an API to access a method within a class defined in the Java part 30B. In order to call this API, a class name and a method name, which are to be accessed, are desired. Therefore, in the present embodiment, a class name and a method name, defined in the Java part 30B, are acquired and stored as the API information while being associated with a corresponding Java object.

Specifically, from an information file stored in the driver storage unit 37, the loading unit 21 acquires the class name defined in the Java part 30B. Note that an acquisition method for the class name is not limited to a case of acquiring from the information file. Like the device driver 30 illustrated in FIG. 5, in place of the information file, in, for example, the JavaScript part 30A, the class name defined in the Java part 306 may be described in advance, and the JavaScript part 30A may notify the loading unit 21 of the class name. In that case, the class name does not have to be described in the information file. Note that the example of FIG. 5 illustrates that a class name such as "http://jp.fujitsu.com/driver/blood_pressure" is defined in the Java part 30B of a file called "driver.jar".

By using the acquired class name, the loading unit 21 accesses a class of the Java part 30B of the device driver 30 and acquires a method name defined in the class. In addition, the acquired class name and method name are stored in, for example, such an API table 25 as illustrated in FIG. 6. A class and a method are saved, as an object of the Java, on a memory, and information is able to be acquired by accessing the object. Accordingly, as illustrated in the API table 25 in FIG. 6, a class name and a method name are stored as the API information while being associated with a corresponding Java object.

In addition, the loading unit 21 imports the JavaScript part 30A of the device driver 30 stored in the driver storage unit 37. In the JavaScript, an API able to execute a character string as a program described by using the JavaScript is provided as standard. By calling that API, the loading unit 21 imports the JavaScript part 30A.

If an API corresponding to a control instruction from the app 45 is called, the imported JavaScript part 30A converts, into a general-purpose API, information of a class name, a method name, an argument, and a callback function that correspond to the control instruction. In addition, the JavaScript part 30A delivers the general-purpose API to the access unit 22 via the coordination unit 34. The general-purpose API is an API able to call the coordination unit 34 serving as a portion of the runtime, from the JavaScript part 30A serving as the web technology. Hereinafter, an example of the information converted into the general-purpose API is illustrated.

this.device.callNative("com.fujitsu.jp.driver.BloodPressure", "GetSystolic", params, function(info){alert('callNative ok': + info);}, function( ) {alert('callNative not ok');});

In the above-mentioned example, callNative is a common interface between the JavaScript part 30A serving as the web technology and the runtime. "com.fujitsu.jp.driver.BloodPressure" is a class name, "GetSystolic" is a method name, and params is an argument. In addition, function(info) and function( ) are callback functions. In other words, in the general-purpose API, an API called, in the JavaScript part 30A, by the app 45 is an argument of a function indicating a common interface. From this, the coordination unit 34 does not have to prepare an API for each of methods delivered by the app 45 and is able to deal with various control instructions (methods) delivered by the app 45 only by preparing the API corresponding to the common interface.

In addition, the imported JavaScript part 30A receives, from the coordination unit 34 as a response to the general-purpose API, a response made by the peripheral device 50. In addition, the JavaScript part 30A replies, with the received response, to the app 45 that called an API of the JavaScript part 30A.

The coordination unit 34 is a function of realizing, in the hybrid app, coordination between a part described by using the web technology and a part described by using the native language, and, for example, the above-mentioned Apache Cordova may be applied thereto. Upon receiving the general-purpose API from the JavaScript part 30A, the coordination unit 34 delivers the general-purpose API to the access unit 22. In addition, upon receiving a response from the Java part 30B, the coordination unit 34 returns, to the JavaScript part 30A, the received response as an argument of a callback function included in the general-purpose API.

The access unit 22 functions as a plug-in of the coordination unit 34. The access unit 22 receives the general-purpose API from the JavaScript part 30A via the coordination unit 34. The access unit 22 extracts the class name and the method name included in the general-purpose API and references the API table 25, thereby acquiring the corresponding Java object. In addition, the access unit 22 calls an API of the Java part 30B, which corresponds to the acquired Java object.

In accordance with the information given notice of by the Java part 30B, the device information exchange unit 38 accesses the peripheral device 50 via the communication unit 39 and exchanges information with the peripheral device 50. The device information exchange unit 38 responds to the Java part 30B with information acquired from the peripheral device 50.

Figure 7:
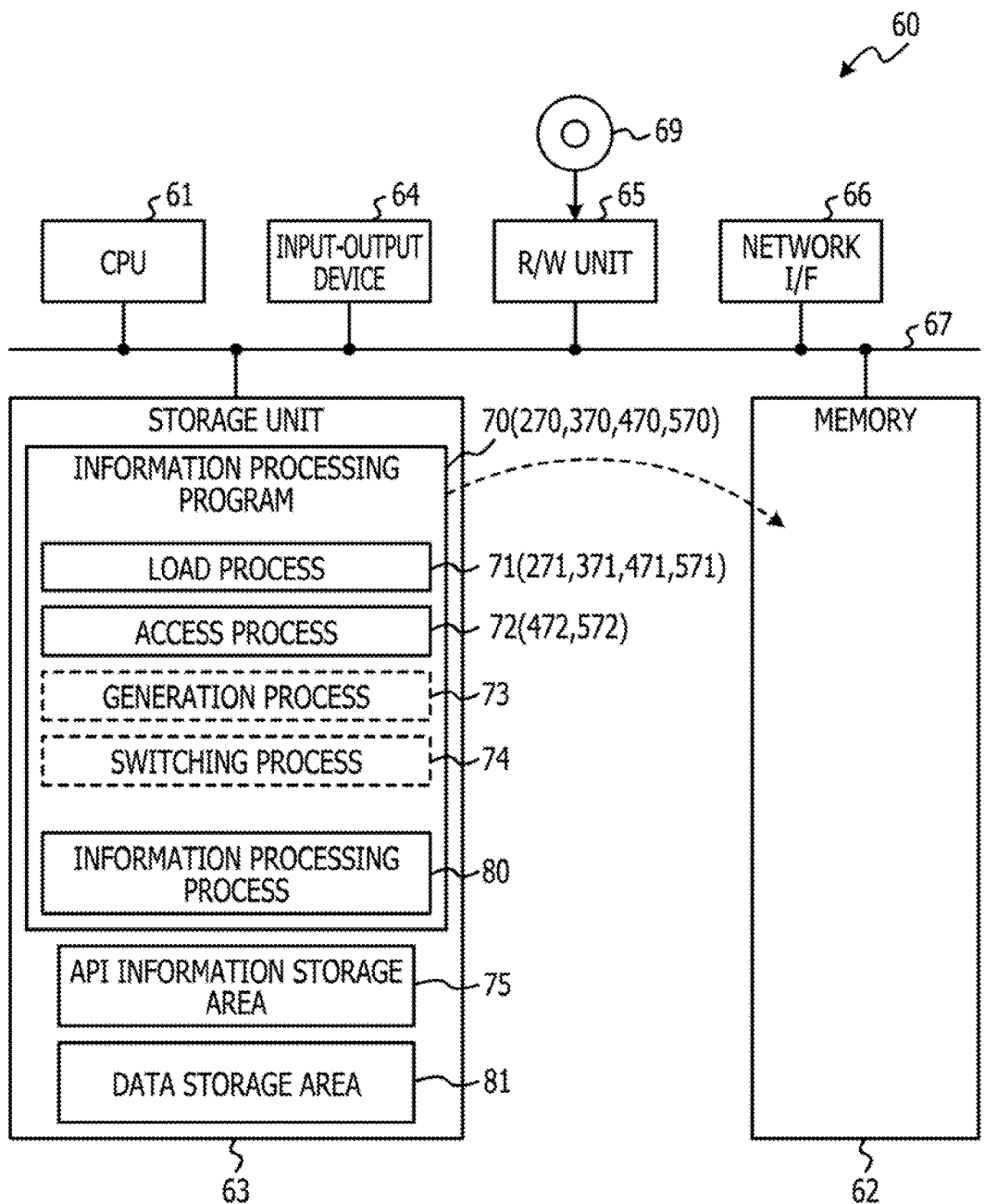
FIG. 7 is a block diagram illustrating a schematic configuration of a computer to function as mobile terminals according to the first to fifth embodiments.

The mobile terminal 20 may be realized by, for example, a computer 60 illustrated in FIG. 7. The computer 60 includes a CPU 61, a memory 62 to serve as a temporary storage area, and a non-volatile storage unit 63. In addition, the computer 60 includes an input-output device 64, a read/write (R/W) unit 65 to control reading and writing of data from and to a recording medium 69, and a network I/F 66 to be coupled to a network such as the Internet. The CPU 61, the memory 62, the storage unit 63, the input-output device 64, the R/W unit 65, and the network I/F 66 are coupled to one another via a bus 67.

The storage unit 63 may be realized by a hard disk drive (HDD), a solid state drive (SSD), a flash memory, or the like. In the storage unit 63 to serve as a storage medium, an information processing program 70 for causing the computer 60 to function as the mobile terminal 20 is stored. In addition, the storage unit 63 includes an API information storage area 75, in which API Information to configure the API table 25 is stored, and a data storage area 81 to function as the app storage unit 32 and the driver storage unit 37. In addition, in the storage unit 63, programs such as an OS and so forth are stored while the illustrations thereof are omitted.

The CPU 61 reads and deploys the information processing program 70 from the storage unit 63 and in the memory 62 and sequentially executes processes included in the information processing program 70. In addition, the CPU 61 deploys, in the memory 62, the API information stored in the API information storage area 75, as the API table 25.

The information processing program 70 includes a loading process 71, an access process 72, and an information processing process 80. The CPU 61 executes the loading process 71, thereby operating as the loading unit 21 illustrated in FIG. 2. In addition, the CPU 61 executes the access process 72, thereby operating as the access unit 22 illustrated in FIG. 2. In addition, the CPU 61 executes the information processing process 80, thereby operating as each of the app reception unit 31, the app starting unit 33, the device detection unit 35, the driver acquisition unit 36, the device information exchange unit 38, the communication unit 39, and the UI control unit 40 illustrated in FIG. 2. From this, the computer 60 that executes the information processing program 70 turns out to function as the mobile terminal 20.

Figure 8:
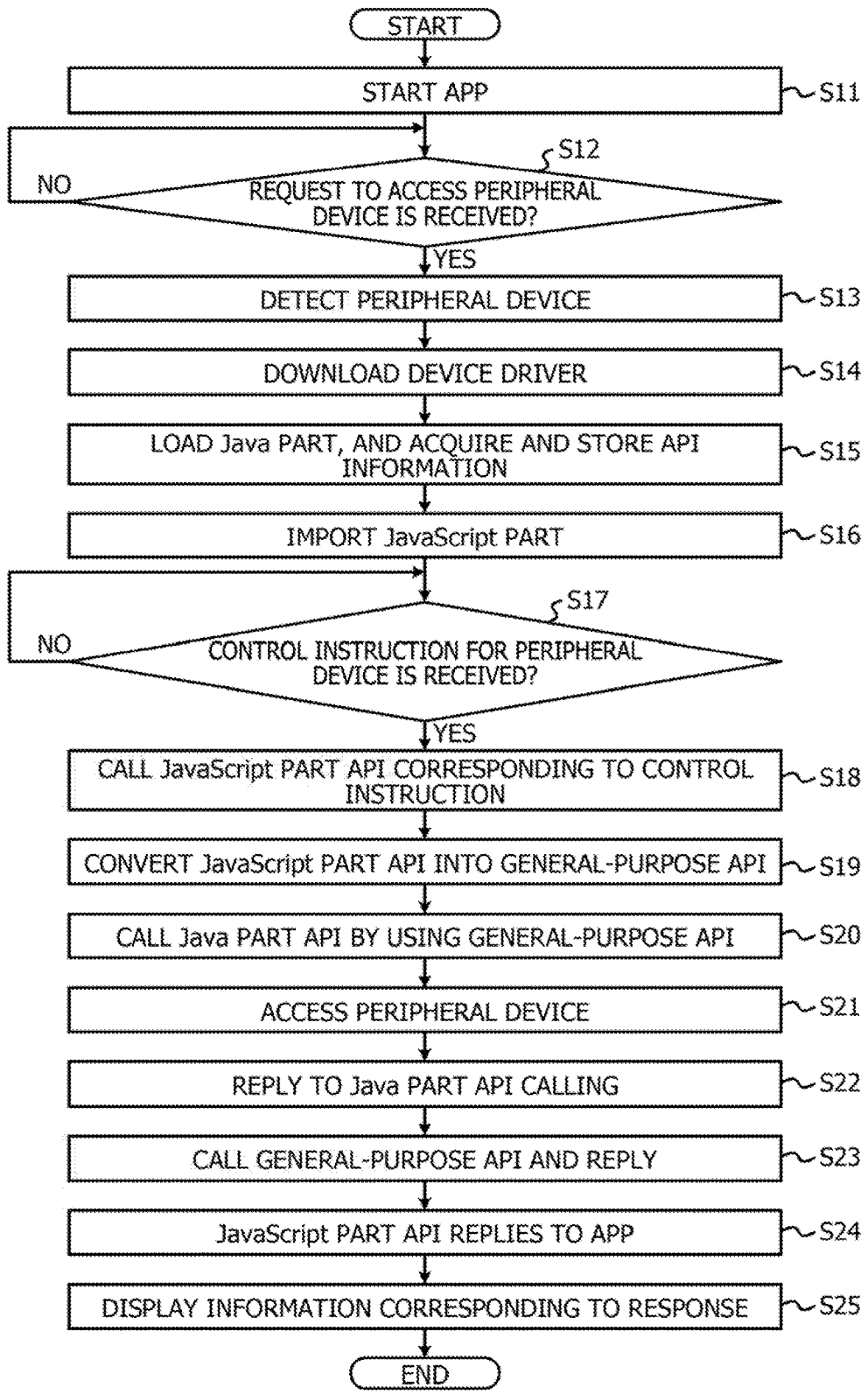
FIG. 8 is a flowchart illustrating an example of information processing in the first embodiment.

Next, operations of the information processing system 10 according to the first embodiment will be described. It is assumed that app programs of apps to utilize the peripheral device 50 are stored in the app storage unit 32. If a user instructs to start an app to utilize the peripheral device 50, an information processing routine illustrated in FIG. 8 is executed in the mobile terminal 20.

In step S11, the app starting unit 33 reads, from the app storage unit 32, an app program of the app instructed to be started by the user, thereby starting the app 45.

Next, in step S12, the app 45 started by the app starting unit 33 determines whether or not a request to access the peripheral device 50 to be used by the app 45 is received. In a case where no access request is received, the determination in the present step is repeated until an access request is received, and in a case where the access request is received, the processing makes a transition to step S13.

In step S13, the app 45 outputs, to the device detection unit 35, an access request specifying the type of the peripheral device 50. In addition, based on scan processing, the device detection unit 35 detects the peripheral device 50 via the communication unit 39. At this time, the device detection unit 35 acquires the service UUID and device ID of the peripheral device 50 and notifies the driver acquisition unit 36 thereof.

Next, in step S14, the driver acquisition unit 36 references such a correspondence table as illustrated in FIG. 4, thereby acquiring a URL corresponding to the service UUID and device ID given notice of by the device detection unit 35. In addition, by using the acquired URL, the driver acquisition unit 36 accesses the device driver distribution server 52, thereby downloading the device driver 30 including the JavaScript part 30A and the Java part 30B.

Next, in step S15, the loading unit 21 loads the Java part 30B of the device driver 30. In addition, at a time of loading the Java part 306, the loading unit 21 acquires the API information in which a class name and a method name defined in the Java part 30B are associated with a corresponding Java object, thereby storing the API information in such a API table 25 illustrated in, for example, FIG. 6.

Next, in step S16, the loading unit 21 imports the JavaScript part 30A of the device driver 30.

Next, in step S17, the app 45 determines whether or not a control instruction for the peripheral device 50 is received. In a case where no control instruction is received, the determination in the present step is repeated until a control instruction is received, and in a case where the control instruction is received, the processing makes a transition to step S18.

In step S18, the app 45 calls an API of the JavaScript part 30A, which corresponds to the control instruction. Next, in step S19, the JavaScript part 30A converts the API called in response to the control instruction, into a general-purpose API including information of a class name, a method name, an argument, and a callback function that correspond to the control instruction, and the JavaScript part 30A delivers the general-purpose API to the access unit 22 via the coordination unit 34.

Next, in step S20, the access unit 22 extracts the class name and the method name from the general-purpose API and references the API table 25, thereby acquiring a corresponding Java object name. In addition, the access unit 22 calls an API of the Java part 30B, used for accessing a Java object indicated by the acquired Java object name. In accordance with the Java object corresponding to the called API, the Java part 30B notifies the device information exchange unit 38 of information for controlling the peripheral device 50.

Next, in step S21, in accordance with the information given notice of by the Java part 30B, the device information exchange unit 38 accesses the peripheral device 50 via the communication unit 39 and exchanges information with the peripheral device 50. Next, in step S22, the device information exchange unit 38 replies to the API called from the Java part 30B, with information acquired from the peripheral device 50.

Next, in step S23, the Java part 30B delivers, to the coordination unit 34, the information with which the device information exchange unit 38 replies. The coordination unit 34 returns, to the JavaScript part 30A, the received response as an argument of the callback function included in the general-purpose API.

Next, in step S24, the JavaScript part 30A replies, with the received response, to the app 45 that called the API of the JavaScript part 30A. Next, in step S25, the app 45 delivers the received response to the UI control unit 40, the UI control unit 40 controls a UI so that information corresponding to the response is displayed, and the information processing routine finishes.

Figure 9:
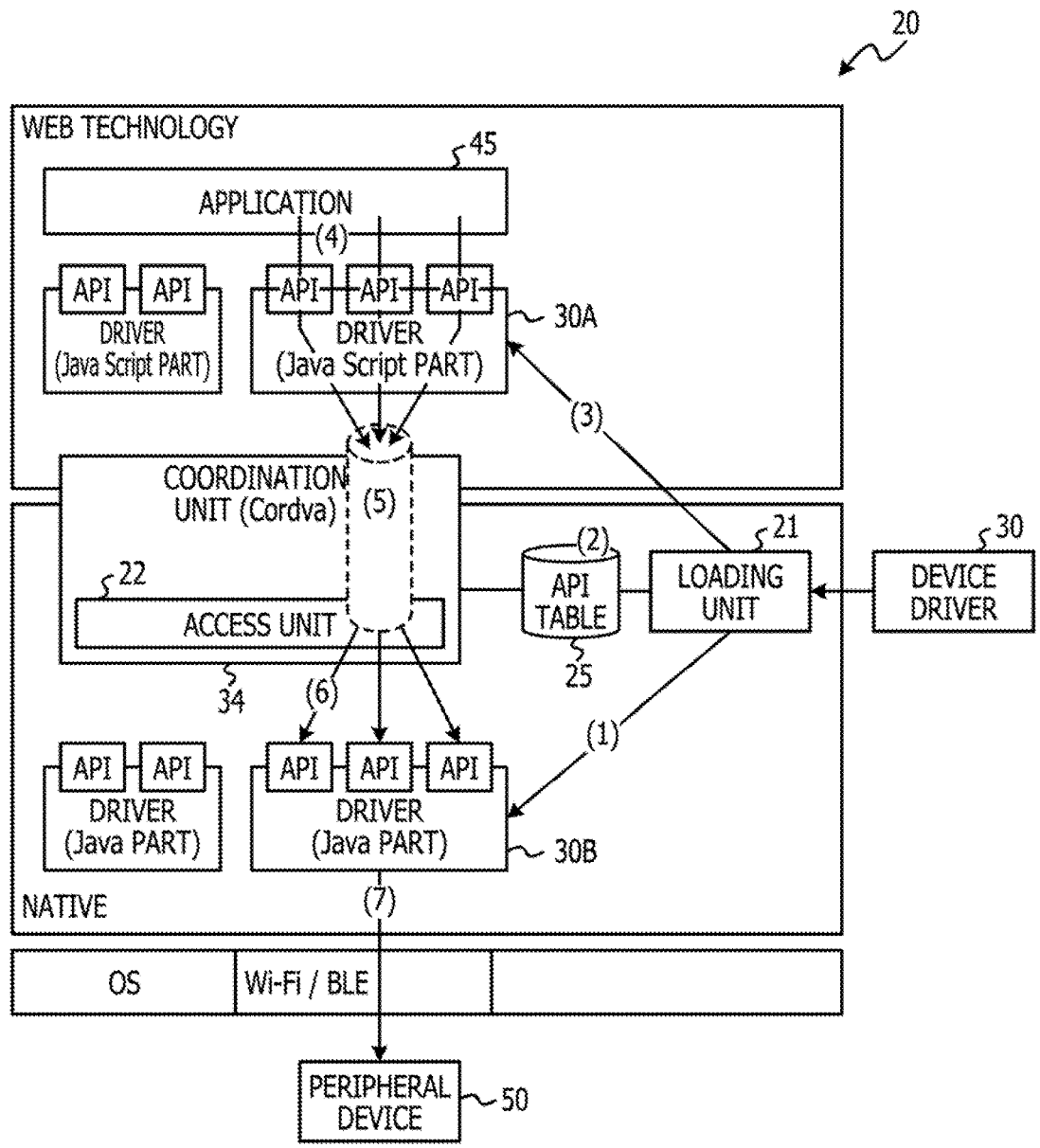
FIG. 9 is a diagram for explaining an outline of the information processing.

FIG. 9 schematically illustrates a flow of the above-mentioned information processing routine. If the device driver 30 of the peripheral device 50 for which the app 45 make an access request is downloaded, the loading unit 21 loads the Java part 30B of the device driver 30 ((1) in FIG. 9). At this time, the loading unit 21 acquires and stores the API information from the Java part 30B and in the API table 25 ((2) in FIG. 9). In addition, the loading unit 21 imports the JavaScript part 30A of the device driver 30 ((3) in FIG. 9).

In addition, if the app 45 issues a control instruction for the peripheral device 50, APIs of the JavaScript part 30A, which correspond to the control instruction, are called ((4) FIG. 9). The called APIs are converted into a general-purpose API and are delivered to the access unit 22 ((5) FIG. 9). Based on the general-purpose API and the API information of the API table 25, the access unit 22 calls APIs of the Java part 30B ((6) FIG. 9). In addition, the Java part 30B controls the peripheral device 50 ((7) in FIG. 9).

Note that the device driver (the JavaScript part 30A and the Java part 30B) made redundant may be unloaded on a case-by-case basis. At a timing when, for example, the JavaScript part 30A makes a request, the Java part 30B may be unloaded. In addition, at a timing such as an app termination time, the JavaScript part 30A may be unloaded, and at a timing when the JavaScript part 30A is unloaded, the Java part 30B may be unloaded.

The unloading of the Java part 30B may be realized by releasing a Java object corresponding to a class of the loaded Java part 30B. Note that in order for the app 45 or the JavaScript part 30A to control the unloading of the Java part 30B, an API, which is used for the unloading and which is able to call the JavaScript part 30A, is prepared in the runtime in advance.

In this way, by arbitrarily unloading the loaded device driver 30, it is possible to reduce used resources such as a memory and so forth, and it is possible to inhibit the JavaScript part 30A or the Java part 30B from being wrongly called.

As described above, according to the information processing system 10 related to the first embodiment, in a case where, in the mobile terminal 20, the app 45 utilizes the peripheral device 50, the device driver 30 of the peripheral device 50 only has to be downloaded and loaded. In addition, since including the first module (the JavaScript part 30A) described by using the web technology and the second module (the Java part 30B) described by using the native language, the device driver 30 may be applied to the hybrid application. Note that coordination between the first module and the second module may be realized by associating the API information acquired from the second module and an API called from the first module with each other. In other words, it is possible to dynamically replace device drivers to be used by the hybrid application to utilize a peripheral device. In addition, since it becomes possible to dynamically replace device drivers, it becomes possible to access various devices without updating an app.

In addition, a complicated program is described in a device driver in some cases. In addition, a device driver for a native app is usually described by a native language. Therefore, it takes a lot of effort to create a device driver for the hybrid app by diverting the device driver for a native app. In a case of only shooting a photograph in coordination with, for example, a camera device, a simple program only used for calling an API for shooting only has to be described as a device driver. However, in a case of providing, as a driver, a program for recognizing and acquiring a character string from a shot photograph (an OCR function), it is desirable to describe a complicated program, and it is difficult to divert a device driver for a native app.

However, in a case of a device driver including the first module described by using a web technology and the second module described by using a native language in such a way as in the present embodiment, it becomes easy to divert a device driver for a native app.

In addition, in a case where a device driver on a native side is defined as a general-purpose device driver in such a way as in the related art, it is difficult to replace the general-purpose device driver. Therefore, a content described in a device driver of a web technology increases. A case where an app utilizes information, related to an operation of a person and detected based on, for example, the value of an acceleration sensor, will be considered. In a case where a native side is a general-purpose device driver, it is difficult for the general-purpose device driver to perform processing corresponding to an app. Therefore, the sensor value acquired from the acceleration sensor turns out to be handed over to a device driver on a web technology side without change. In addition, it is conceivable that, in the device driver on the web technology, a device driver to perform such an operation as analyzing the sensor value, determining the operation of the person, and returning a determination result to the app is created.

However, a program described by using a script language serving as the web technology operates at a slower rate. In particular, it is difficult to subject the JavaScript to optimum just in time (JIT) compilation. Therefore, while various speed-up techniques are developed, the JavaScript operates at a rate slower than in a case of compiling the Java or the C language. Accordingly, in a case where the number of processing operations based on the JavaScript is larger, a processing time of the entire device driver becomes longer than in a case where the number of processing operations based on the Java or the C language is larger. In addition, it takes time to perform communication between the web technology and the native language. Therefore, in a case where the native language hands over all acquired sensor values to the web technology, the time taken to perform the communication becomes longer than in a case where a determination result obtained by analyzing sensor values and performing determination is only handed over.

On the other hand, in a case of the present embodiment, it is possible to replace the device driver 30. Therefore, in accordance with the peripheral device 50 to be used, it is possible to use a device driver to perform a large number of processing operations in the Java part. Accordingly, it is possible to accelerate the processing speed of the device driver.

Note that while, in the first embodiment, a case where first the Java part is loaded and the JavaScript part is imported after that is described, there is no limitation thereto.

Like the device driver 30 illustrated in, for example, FIG. 5, a program for calling the lava part 30B is described in the JavaScript part 30A in advance, and first this JavaScript part 30A is imported on a priority basis. In addition, based on a request from the JavaScript part 30A, the Java part 30B may be loaded. In addition, the JavaScript part 30A is imported first, and by being triggered by calling of an API of the Java part 30B, performed by the access unit 22, the Java part 30B may be loaded. By doing this, it is possible to inhibit the Java part 30B from being undesirably loaded.

Second Embodiment

Next, a second embodiment will be described. Note that regarding an information processing system according to the second embodiment, the same symbol is assigned to the same portion as that of the information processing system 10 according to the first embodiment, and the detailed description thereof will be omitted.

As illustrated in FIG. 1, an information processing system 210 according to the second embodiment includes a mobile terminal 220, the peripheral device 50, the device driver distribution server 52, and the app distribution server 54.

Figure 10:
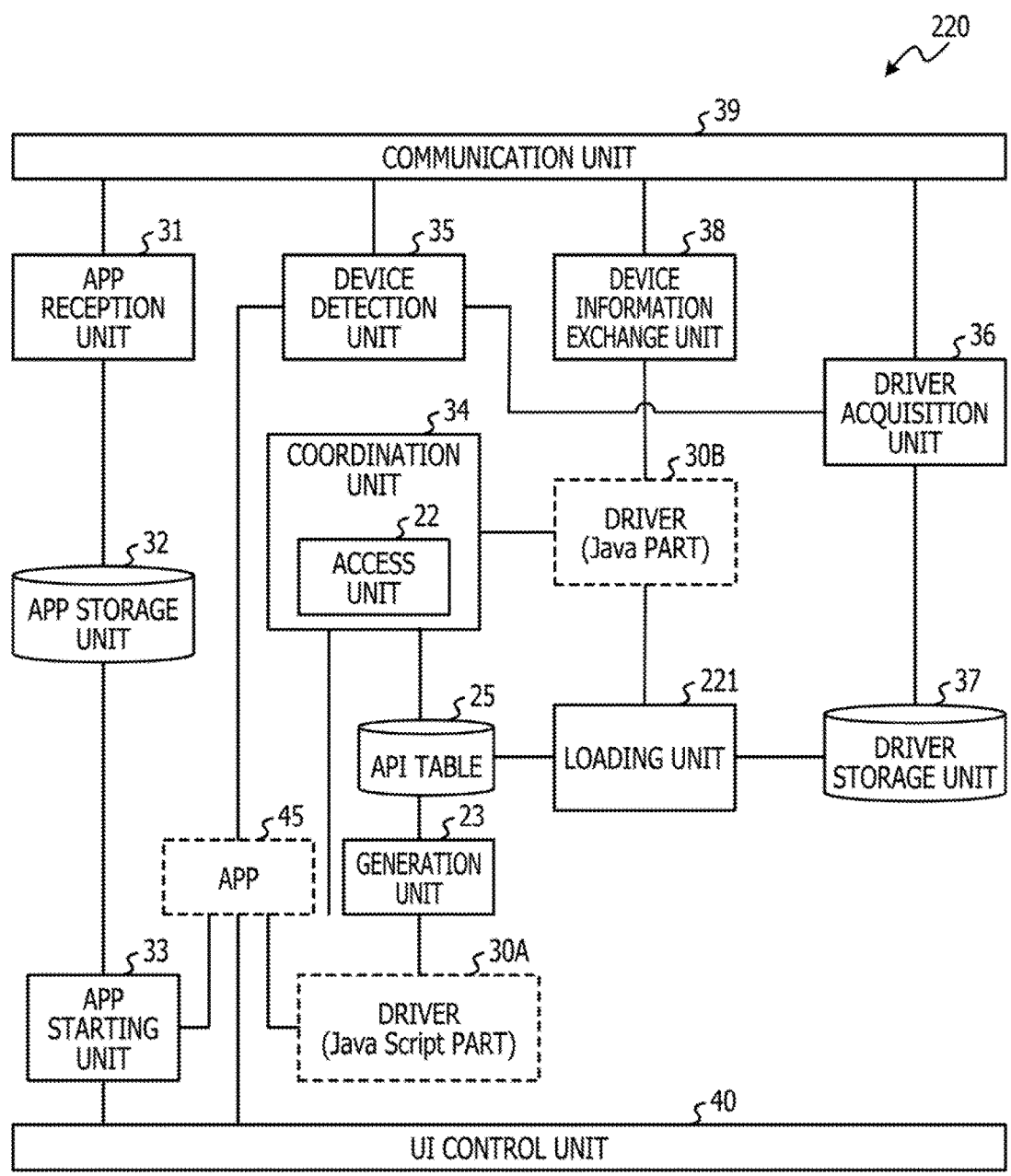
FIG. 10 is a functional block diagram illustrating a schematic configuration of the mobile terminal according to the second embodiment.

FIG. 10 illustrates a schematic configuration of the mobile terminal 220. The mobile terminal 220 includes a generation unit 23 in addition to the individual functional units of the mobile terminal 20 according to the first embodiment and includes a loading unit 221 in place of the loading unit 21 of the mobile terminal 20 according to the first embodiment.

The loading unit 221 is different from the loading unit 21 in the first embodiment in that the loading unit 221 imports not the JavaScript part 30A stored in the driver storage unit 37 but the JavaScript part 30A generated in the generation unit 23 to be described later.

Since, as described above, a program described by using the native language operates at a rate faster than a program described by using the script language, it is desirable that the description amount of the JavaScript part 30A is as small as possible. In the JavaScript part 30A, simple conversion processing for calling, for example, the Java part 30B only has to be described. Therefore, in the second embodiment, the generation unit 23 generates the JavaScript part 30A in which the simple conversion processing is described.

Specifically, the generation unit 23 generates the JavaScript part 30A in which a method name of the API information stored in the API table 25 is an API of the JavaScript part 30A, which is to be called by the app 45. In addition, in a case where there is an argument in the method name of the API information, in other words, an API to be called from the Java part 30B, information of the argument is added to the API of the JavaScript part 30A. Like the argument, at a time of storing the API information in the API table 25, information desirable for generating the JavaScript part 30A is stored along therewith.

As illustrated below, the generation unit 23 is able to generate, for example, the JavaScript part 30A from the Java part 30B.

```
<Java Part 30B>
Class SensorNativeDriver {static public void func1(int value1) {...}}
<Generated JavaScript Part 30A>
    function func1(value1)
{this.device.callNative("com.fjl.nativedriver.dex/SensorNativeDriver",
"func1",[value1], function( ){ }, function( ) { });}
```

Note that in order to limit a method of the Java part 30B, accessible from the JavaScript part 30A, an annotation may be assigned to a definition part of a method in the Java part 30B. As illustrated below, for example, an annotation ("@JSMethod" in the following example) is assigned in advance to a method of the Java part 30B, accessible from the JavaScript part 30A.

@JSMethodpublic void getSystolic (JSONObject json, JavaDriverListener driverListener) { }

The generation unit 23 determines that a method to which the annotation is assigned is a method accessible from the JavaScript part 30A, and the generation unit 23 describes, in the JavaScript part 30A, an API for calling the method. In this case, regarding a method to which an annotation is assigned, when the loading unit 221 stores the API information in the API table 25, the annotation is stored in the API table 25 along therewith. Based on the API information to which an annotation is assigned in the API table 25, the generation unit 23 only has to generate the JavaScript part 30A.

The mobile terminal 220 may be realized by, for example, the computer 60 illustrated in FIG. 7. In the storage unit 63 in the computer 60, an Information processing program 270 for causing the computer 60 to function as the mobile terminal 220 is stored. The CPU 61 reads and deploys the information processing program 270 from the storage unit 63 and in the memory 62 and sequentially executes processes included in the information processing program 270. The information processing program 270 includes a loading process 271, the access process 72, a generation process 73, and the information processing process 80.

The CPU 61 executes the loading process 271, thereby operating as the loading unit 221 illustrated in FIG. 10. In addition, the CPU 61 executes the generation process 73, thereby operating as the generation unit 23 illustrated in FIG. 10. The other processes are the same as those of the information processing program 70 in the first embodiment. From this, the computer 60 that executes the information processing program 270 turns out to function as the mobile terminal 220.

Next, regarding operations of the information processing system 210 according to the second embodiment, points different from the first embodiment will be described.

Before step S16 in the information processing routine illustrated in FIG. 8, the generation unit 23 references the API table 25, thereby generating the JavaScript part 30A. In addition, in step S16, the loading unit 221 imports not the device driver 30 stored in the driver storage unit 37 but the JavaScript part 30A generated by the generation unit 23.

Since processing operations in subsequent stages are the same regardless of the JavaScript part 30A generated from the Java part 30B or the JavaScript part 30A downloaded along with the Java part 30B, the descriptions thereof will be omitted.

As described above, according to the information processing system 210 related to the second embodiment, based on the second module described by using the native language, the first module of the web technology is automatically generated. Therefore, since the second module only has to be prepared as a device driver, it is possible to make development of a device driver efficient.

Note that the JavaScript part 30A generated in the second embodiment may be stored and the stored JavaScript part 30A may be imported in a case where the same Java part 30B is loaded again. In this case, the class name of the Java part 30B, used at the time of generating the JavaScript part 30A, is stored while being associated with the generated JavaScript part 30A. In addition, it is desirable that the JavaScript part 30A corresponding to the class name defined in the loaded Java part 30B is searched for within the stored JavaScript part 30A and is used. From this, in a case where the Java part 30B of the same device driver 30 is loaded, the JavaScript part 30A does not have to be generated again. Therefore, it is possible to speed up importing of the JavaScript part 30A.

In addition, there is a case where the version of the Java part 30B is upgraded. Therefore, in order to respond to this, it is desirable that, as illustrated below, for example, a class name of the Java part 30B and version information of that class are used in combination.

{"Java_driver": "driver.jar", "java_driver_class": "com.fujitsu.jp.driver.BloodPressure","version": "1.01" }

Furthermore, in a case where an API defined in the Java part 30B of the different device driver 30 has the same function, a method for absorbing a difference between these APIs may be implemented. In a case where device vendors are different even if the type of the peripheral device 50 is, for example, the same sphygmomanometer, the device drivers 30 different from each other are created. In this case, methods of the Java parts 30B Included in the respective device drivers 30 are defined in forms different from each other in some cases. Therefore, such an API correspondence table as illustrated in, for example, FIG. 11 is created in advance.

An example of this API correspondence table indicates correspondence relationships of APIs of device drivers corresponding to respective device IDs=0x12340001 and 0x23451234, regarding the peripheral device 50 indicated by a service UUID=0x1810. More specifically, it indicates that an API of the JavaScript part 30A, used for accessing a method "getSystolic" of the Java part 30B of the device ID=0x12340001 is an API1. In addition, it is assumed that in the Java part 30B of the device ID=0x23451234, a method "getBloodPressureSystolic" has the same function as that of the above-mentioned "getSystolic". In this case, in the same way as "getSystolic" of the device ID=0x12340001, "getBloodPressureSystolic" is associated with the API1 of the JavaScript part 30A. Based on this information, in each of a case of the device ID=0x12340001 and a case of the device ID=0x23451234, it is possible to generate the JavaScript part 30A so as to enable an equivalent method of the Java part 30B to be called based on the same API1. In a case where the Java part 30B of, for example, the device ID=0x23451234 is loaded, the generation unit 23 is able to generate the JavaScript part 30A as follows.

function getSystolic(success, failure, unit) {cordova.exec (success, failure, "JavaDriver", "call_Java", ["getBloodPressureSystolic", unit]);}

From this, it is possible to generate the JavaScript part 30A to absorb a difference between methods defined in the respective Java parts 30B so that even the Java parts 30B having different APIs are accessible by the app 45 by using the same API.

Third Embodiment

Next, a third embodiment will be described. Note that regarding an information processing system according to the third embodiment, the same symbol is assigned to the same portion as that of the information processing system 10 according to the first embodiment, and the detailed description thereof will be omitted.

As illustrated in FIG. 1, an information processing system 310 according to the third embodiment includes a mobile terminal 320, the peripheral device 50, the device driver distribution server 52, and the app distribution server 54.

Figure 12:
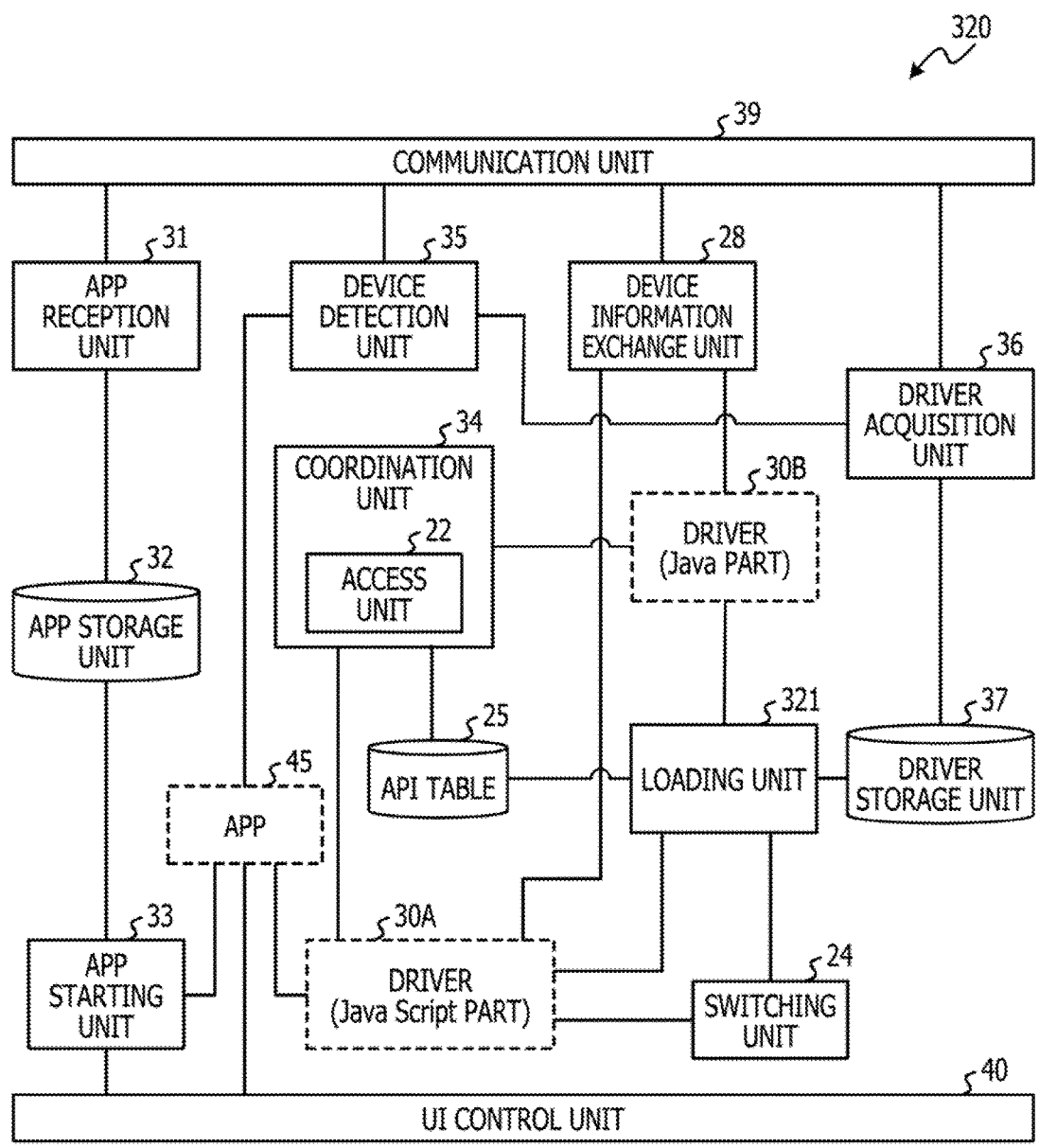
FIG. 12 is a functional block diagram illustrating a schematic configuration of the mobile terminal according to the third embodiment.

FIG. 12 illustrates a schematic configuration of the mobile terminal 320. The mobile terminal 320 includes a switching unit 24 in addition to the individual functional units of the mobile terminal 20 according to the first embodiment and includes a loading unit 321 in place of the loading unit 21 of the mobile terminal 20 according to the first embodiment.

Here, within OSs to be utilized by the mobile terminal 320, there is an OS in which an app to operate on the OS is described only by using a web technology in such a manner as, for example, the Firefox (registered trademark) OS. In this case, functions provided by the OS are provided as APIs accessible by the web technology. Accordingly, a device driver is able to be described only by using the web technology. Therefore, in a case where the OS is, for example, the Android (registered trademark), the JavaScript part 30A and the Java part 30B are used as a device driver, and in a case of the Firefox OS, only the JavaScript part 30A is used as a device driver. Therefore, in the third embodiment, a device driver to be used is switched depending on an OS mounted in the mobile terminal 320.

In the same way as the loading unit 21 according to the first embodiment, the loading unit 321 loads the Java part 30B of the device driver 30 stored in the driver storage unit 37 and imports the JavaScript part 30A. At this time, in a case where the OS mounted in the mobile terminal 320 performs entire processing by using the web technology in such a manner as, for example, the Firefox OS, in other words, in a case where the native language is not recognizable, the Java part 30B is not loaded. The loading unit 321 notifies the switching unit 24 of information indicating whether or not the loading of the Java part 30B is completed.

Based on the notification from the loading unit 321, the switching unit 24 switches between directly accessing the device information exchange unit 38 from the JavaScript part 30A and calling the Java part 30B in the same way as in the first embodiment. Specifically, the switching unit 24 provides an API accessible from the JavaScript part 30A, and at a time when this API is accessed from the JavaScript part 30A, the switching unit 24 returns information indicating whether or not the Java part 30B exists. Based on the response from the API of the switching unit 24, the JavaScript part 30A is able to switch an access destination. Specifically, in a case where the Java part 30B exists, the JavaScript part 30A converts a called API into a general-purpose API and delivers the general-purpose API to the access unit 22, in the same way as in the first embodiment. In a case where no Java part 30B exists, the JavaScript part 30A directly delivers, to the device information exchange unit 38, a control instruction indicated by the called API.

The mobile terminal 320 may be realized by, for example, the computer 60 illustrated in FIG. 7. In the storage unit 63 in the computer 60, an information processing program 370 for causing the computer 60 to function as the mobile terminal 320 is stored. The CPU 61 reads and deploys the information processing program 370 from the storage unit 63 and in the memory 62 and sequentially executes processes included in the information processing program 370. The information processing program 70 includes a loading process 371, the access process 72, a switching process 74, and the information processing process 80.

The CPU 61 executes the loading process 371, thereby operating as the loading unit 321 illustrated in FIG. 12. In addition, the CPU 61 executes the switching process 74, thereby operating as the switching unit 24 illustrated in FIG. 12. The other processes are the same as those of the information processing program 70 in the first embodiment. From this, the computer 60 that executes the information processing program 370 turns out to function as the mobile terminal 320.

Figure 13:
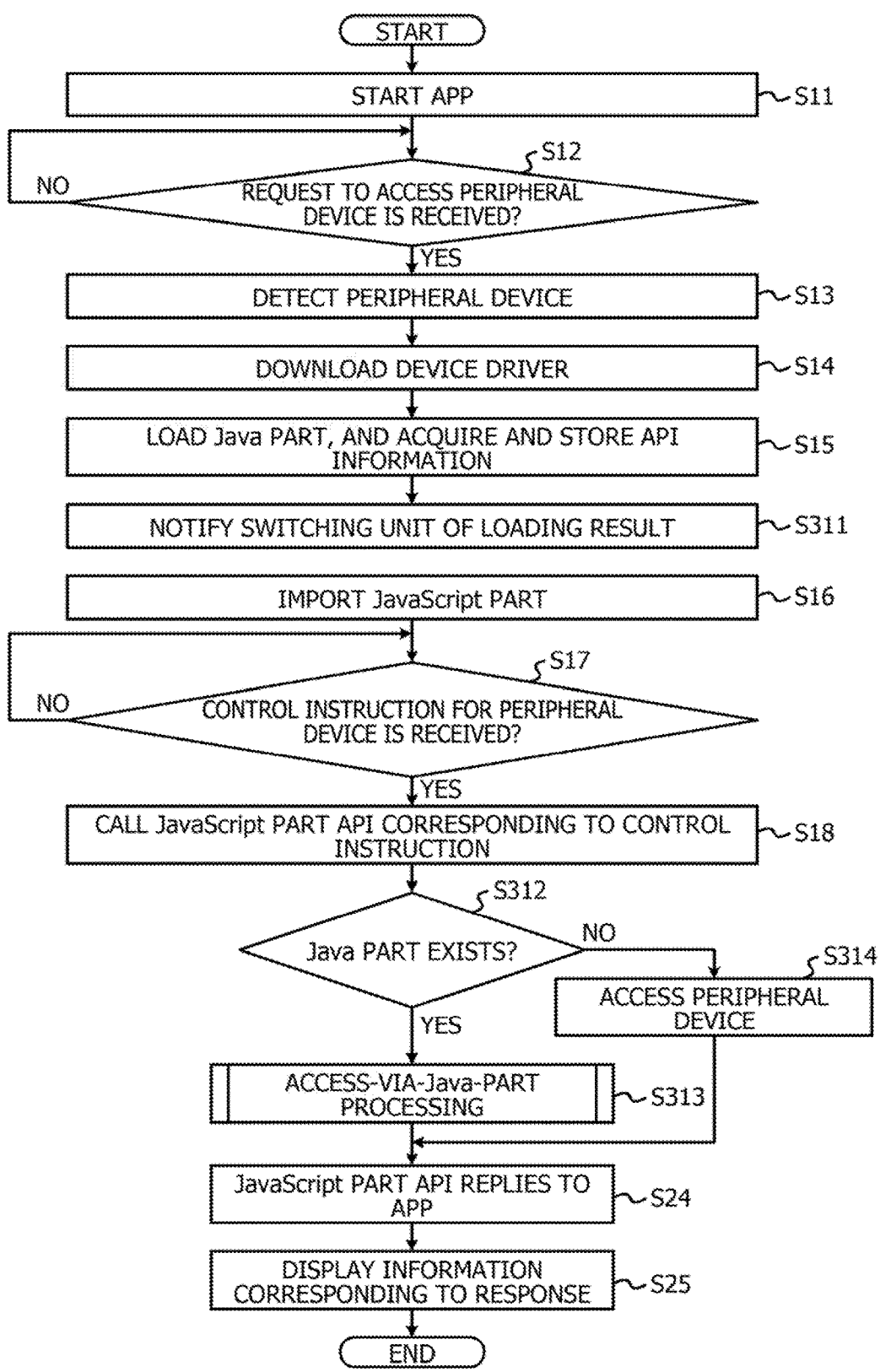
FIG. 13 is a flowchart illustrating an example of information processing in the third embodiment.

Next, operations of the information processing system 310 according to the third embodiment will be described. In the third embodiment, an information processing routine illustrated in FIG. 13 is executed in the mobile terminal 320. Note that, in the information processing routine in the third embodiment, the same symbol is assigned to the same processing operation as that of the information processing routine (FIG. 8) according to the first embodiment and the detailed description thereof will be omitted.

In step S15, in a case where the OS is able to recognize the Java, the loading unit 321 loads the Java part 30B and stores the API information in the API table 25. On the other hand, in a case where the OS is not able to recognize the Java, the Java part 30B is not loaded.

Next, in step S311, the switching unit 24 is notified of whether or not the loading unit 321 completes loading of the Java part 30B in the above-mentioned step S15. Next, in step S312 after steps S16 to S18, the JavaScript part 30A accesses the switching unit 24. Based on a loading result of the Java part 30B, given notice of by the loading unit 321 in the above-mentioned step S311, the switching unit 24 returns, to the JavaScript part 30A, information of whether or not the Java part 30B exists. Based on the response from the switching unit 24, the JavaScript part 30A determines whether or not the Java part 30B exists. In a case where the Java part 30B exists, the processing makes a transition to step S313, and access-via-Java-part processing is performed. The access-via-Java-part processing is the same processing as steps S19 to S23 in the information processing routine in the first embodiment.

On the other hand, in a case where no Java part 30B exists, the processing makes a transition to step S314, and the JavaScript part 30A directly delivers, to the device information exchange unit 38, a control instruction indicated by the called API.

Next, in step S24, the JavaScript part 30A receives a response from the coordination unit 34 or the device information exchange unit 38 and replies to an app that calls the API of the JavaScript part 30A. In addition, in step S25, information corresponding to the response is displayed, and the information processing routine finishes.

As described above, according to the information processing system 310 related to the third embodiment, depending whether or not the second module described by using the native language exists, a destination of an access from the first module described by using the web technology is switched. From this, in accordance with the OS mounted in the mobile terminal 320 that downloads the device driver, it is possible to adequately switch an operation.

In addition, regardless of whether or not the second module operates, the first module (JavaScript part) operates in each of, for example, the Android, the iOS, and the Firefox OS. Therefore, since it is possible to commonalize the first module, one device driver 30 only has to be prepared independently of OSs. Accordingly, it is possible to make development of the device driver 30 efficient.

Note that while a case where one device driver 30 is downloaded independently of OSs and a module to be used is switched between the first module and the second module at a time of utilizing the peripheral device 50 is described in the third embodiment, there is no limitation thereto. In accordance with an OS, a device driver to be downloaded may be switched. Specifically, at a time when the driver acquisition unit 36 downloads a device driver, OS information is transmitted to the device driver distribution server 52. The device driver distribution server 52 distributes a device driver corresponding to this OS Information. From this, it is possible to perform an operation corresponding to the OS without switching an operation at a time of utilizing the peripheral device 50.

In a case where the OS is, for example, the Android, such an information file illustrated as follows is transmitted and the device driver 30 including the JavaScript part 30A and the Java part 30B is distributed, in the same way as in the above-mentioned embodiments.

{"java_driver": "driver.jar", "java_driver_class": "com.fujitsu.jp.driver.BloodPressure", "js_driver": "driverAndroidOS.js"}

In addition, in a case where the OS is the Firefox OS, such an Information file illustrated as follows is transmitted, and a device driver of only the JavaScript part 30A is distributed.

{"js_driver": "driverFirefoxOS.js"}

In addition, information of both files of the Java part 30B and the JavaScript part 30A may be included in the information file in advance, and at a time of creating a URL for acquiring a device driver, a URL for acquiring only a desirable device driver may be created.

Fourth Embodiment

Next, a fourth embodiment will be described. Note that regarding an information processing system according to the fourth embodiment, the same symbol is assigned to the same portion as that of the information processing system 10 according to the first embodiment, and the detailed description thereof will be omitted.

As illustrated in FIG. 1, an information processing system 410 according to the fourth embodiment includes a mobile terminal 420, the peripheral device 50, the device driver distribution server 52, and the app distribution server 54.

Figure 14:
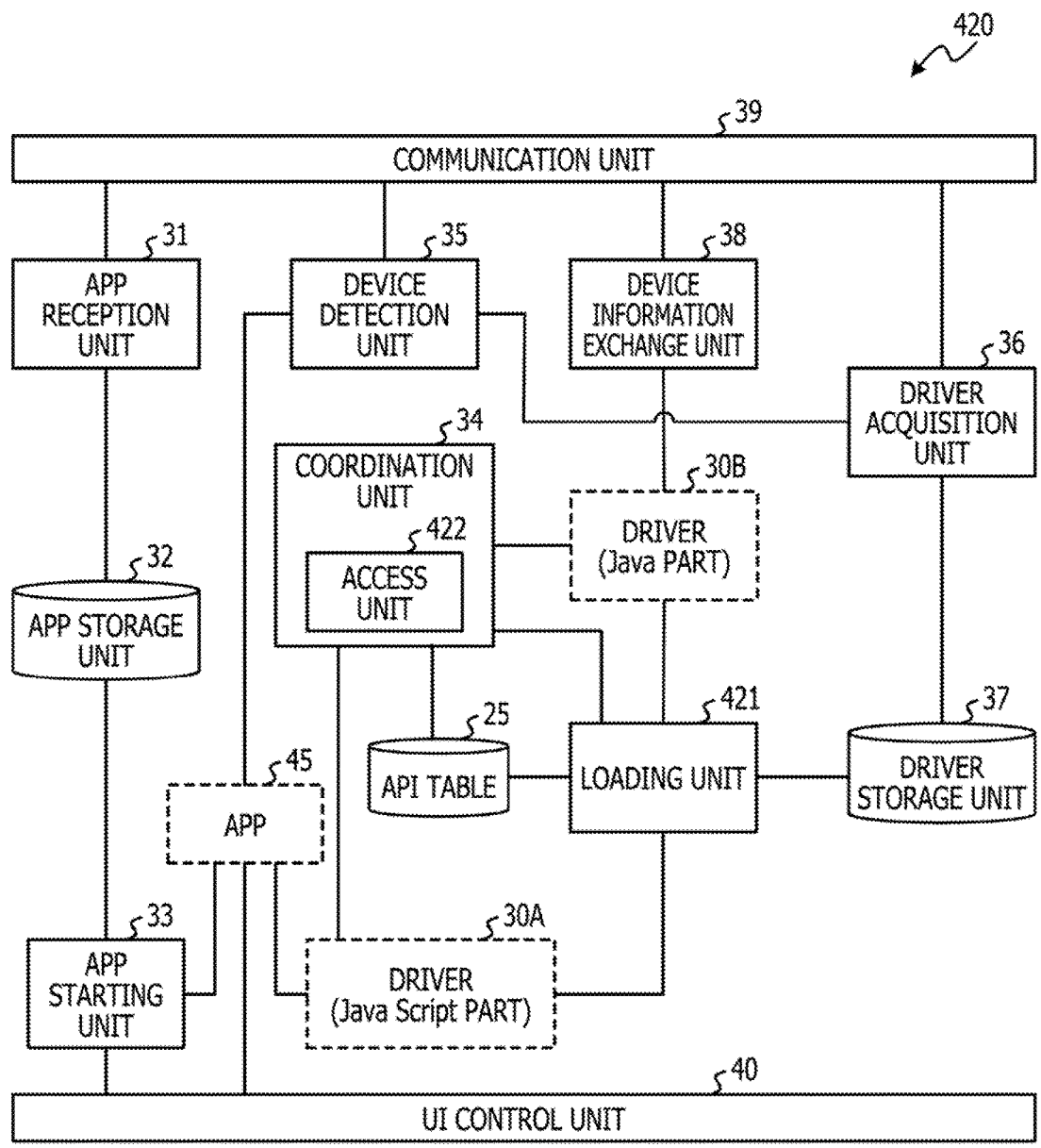
FIG. 14 is a functional block diagram illustrating a schematic configuration of the mobile terminal according to the fourth embodiment.

FIG. 14 illustrates a schematic configuration of the mobile terminal 420. The mobile terminal 420 includes a loading unit 421 in place of the loading unit 21 of the mobile terminal 20 according to the first embodiment and includes an access unit 422 in place of the access unit 22.

In the same way as the loading unit 21 according to the first embodiment, the loading unit 421 loads the Java part 30B of the device driver 30 stored in the driver storage unit 37 and imports the JavaScript part 30A. In addition, at a time of importing the JavaScript part 30A, the loading unit 421 sets a variable such as, for example, var secret=abcdef123456. Furthermore, as illustrated as follows, the loading unit 421 describes in the JavaScript part 30A so that the set variable is included, as an argument, in an API for calling the Java part 30B, for example.

function getSystolic(success, failure, unit) {cordova.exec (success, failure, "JavaDriver", "call_java", ["getSystolic", secret, unit]);}

In addition, the loading unit 421 notifies the access unit 422 of the set variable.

The access unit 422 determines whether or not a variable included, as an argument, in a general-purpose API delivered by the JavaScript part 30A and the variable given notice of by the loading unit 421 coincide with each other. In a case where the variables coincide with each other, the access unit 422 calls the Java part 30B, and in a case where the variables do not coincide with each other, the access unit 422 returns an error to the JavaScript part 30A.

The mobile terminal 420 may be realized by, for example, the computer 60 illustrated in FIG. 7. In the storage unit 63 in the computer 60, an information processing program 470 for causing the computer 60 to function as the mobile terminal 420 is stored. The CPU 61 reads and deploys the information processing program 470 from the storage unit 63 and in the memory 62 and sequentially executes processes included in the information processing program 470. The information processing program 470 includes a loading process 471, an access process 472, and the information processing process 80.

The CPU 61 executes the loading process 471, thereby operating as the loading unit 421 illustrated in FIG. 14. In addition, the CPU 61 executes the access process 472, thereby operating as the access unit 422 illustrated in FIG. 14. The other processes are the same as those of the information processing program 70 in the first embodiment. From this, the computer 60 that executes the information processing program 470 turns out to function as the mobile terminal 420.

Figure 15:
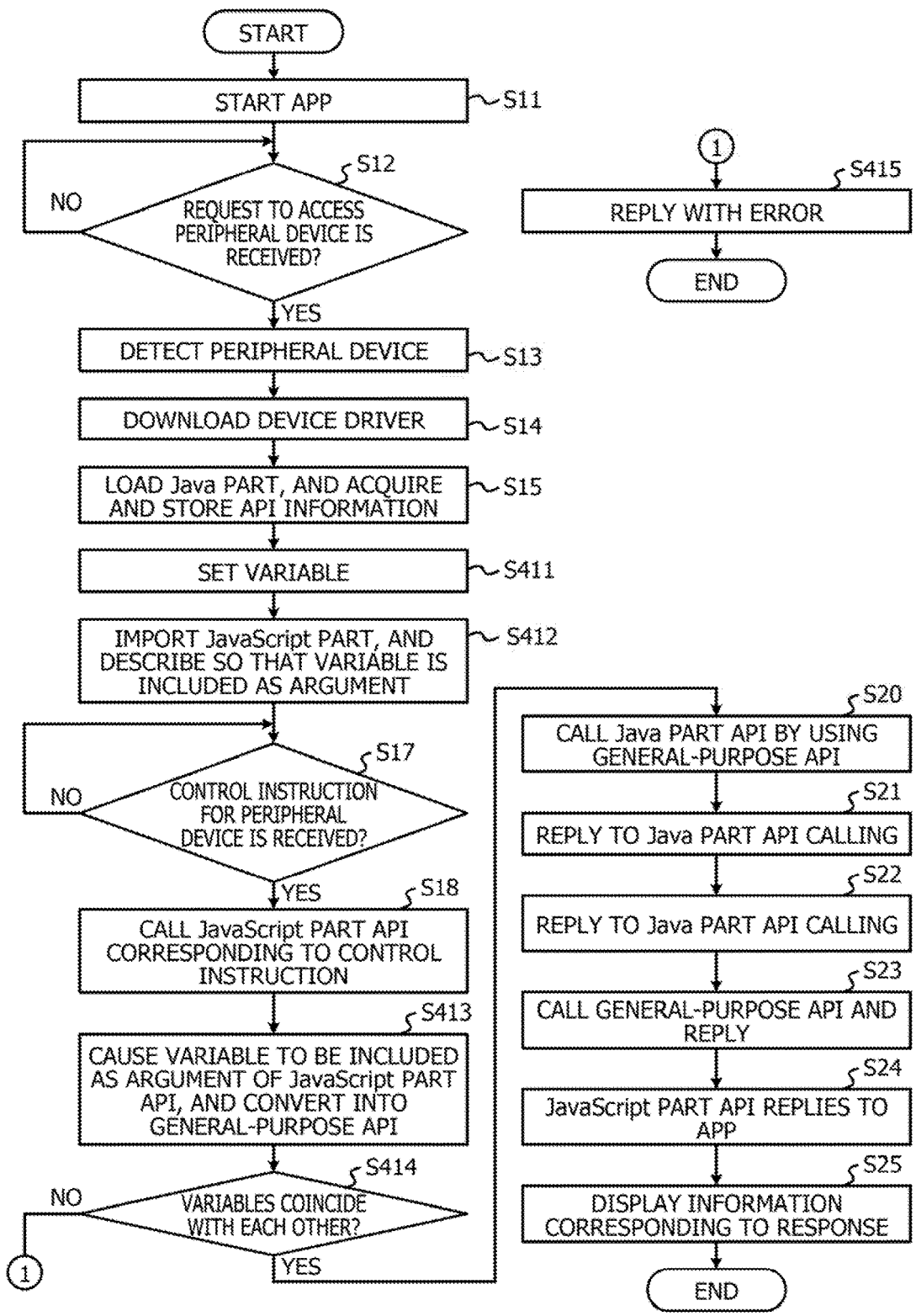
FIG. 15 is a flowchart illustrating an example of information processing in the fourth embodiment.

Next, operations of the information processing system 410 according to the fourth embodiment will be described. In the fourth embodiment, an information processing routine illustrated in FIG. 15 is executed in the mobile terminal 420. Note that, in the information processing routine in the fourth embodiment, the same symbol is assigned to the same processing operation as that of the information processing routine (FIG. 8) according to the first embodiment and the detailed description thereof will be omitted.

In step S411 subsequent to step S15, the loading unit 421 sets a variable and notifies the access unit 422 of the set variable.

Next, in step S412, the loading unit 421 imports the JavaScript part 30A and describes in the JavaScript part 30A so that the set variable is included, as an argument, in an API for calling the Java part 30B.

Next, in subsequent step S413 after steps S17 and S18, the variable set in the above-mentioned step S411 is caused to be included as an argument of an API of the JavaScript part 30A called by the app 45, and the API of the JavaScript part 30A is converted into a general-purpose API and is delivered to the access unit 422.

Next, in step S414, the access unit 422 determines whether or not a variable included, as an argument, in the general-purpose API delivered from the JavaScript part 30A and the variable given notice of by the loading unit 421 in the above-mentioned step S411 coincide with each other. In a case where the variables coincide with each other, steps S20 to S25 are executed in the same way as in the first embodiment. On the other hand, in a case where the variables do not coincide with each other, the processing makes a transition to step S415, and the access unit 422 returns an error to the app 45 via the JavaScript part 30A and terminates the information processing routine.

As described above, according to the information processing system 410 related to the fourth embodiment, the first module described by using the web technology and the access unit 422 are each caused to have the same variable. In addition, in a case where the first module calls the second module, it is determined, based on whether or not a variable the first module has and a variable the access unit 422 has coincide with each other, whether or not the second module is permitted to be accessed. From this, it is possible to inhibit the second module from being called by a module other than the first module, and security is enhanced.

Fifth Embodiment

Next, a fifth embodiment will be described. Note that regarding an Information processing system according to the fifth embodiment, the same symbol is assigned to the same portion as that of the information processing system 10 according to the first embodiment, and the detailed description thereof will be omitted.

As illustrated in FIG. 1, an information processing system 510 according to the fifth embodiment includes a mobile terminal 520, the peripheral device 50, the device driver distribution server 52, and the app distribution server 54.

Depending on an OS mounted in the mobile terminal 520, native languages are used in some cases. In a case of, for example, the Android, the C language is able to be used as a native language in addition to the Java. Therefore, in the fifth embodiment, a configuration in which a device driver includes the first module described by using the JavaScript, the second module described by using the Java, and a third module described by using the C language is adopted.

Figure 16:
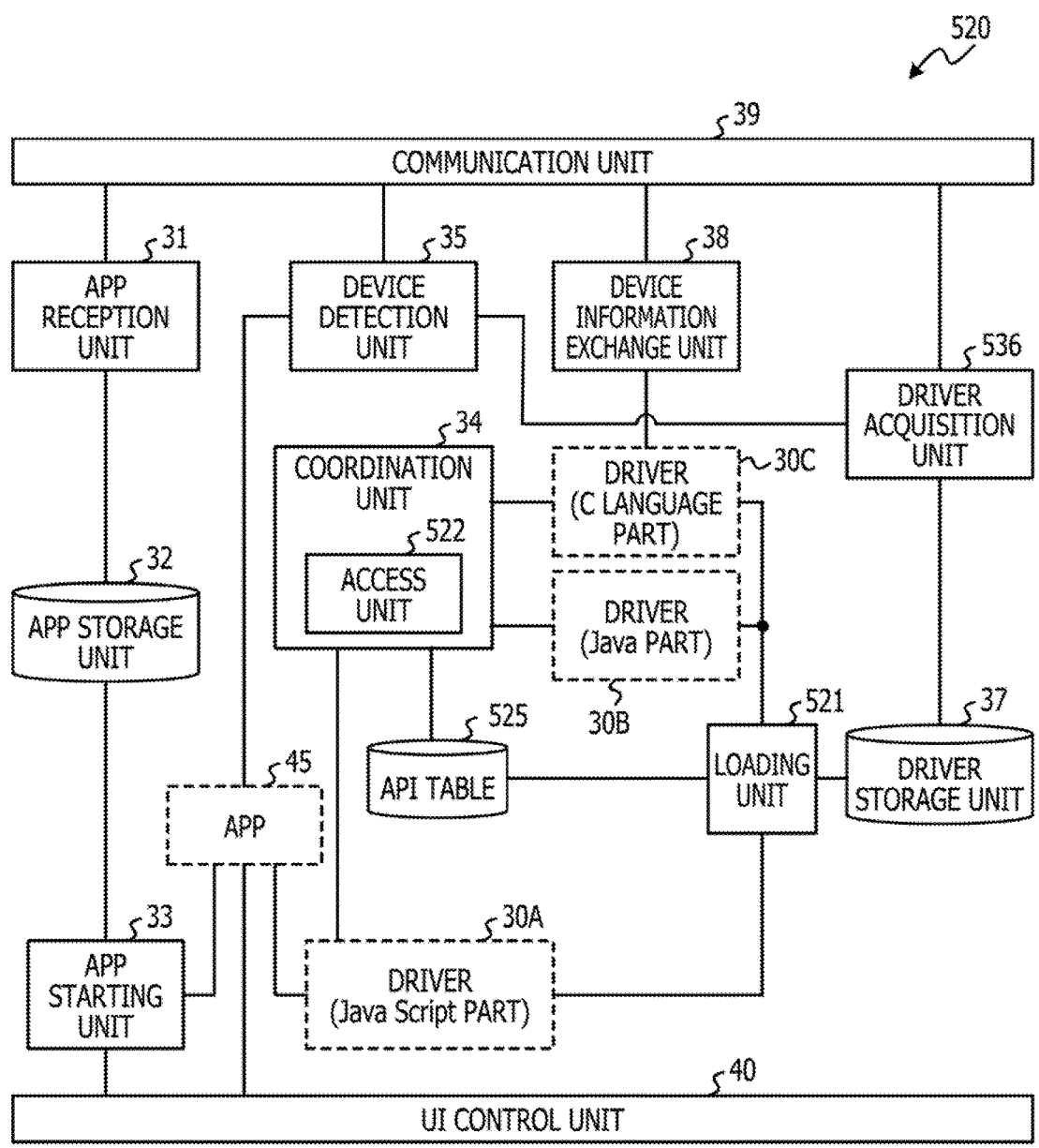
FIG. 16 is a functional block diagram illustrating a schematic configuration of the mobile terminal according to the fifth embodiment.

FIG. 16 illustrates a schematic configuration of the mobile terminal 520. The mobile terminal 520 includes a loading unit 521 in place of the loading unit 21 of the mobile terminal 20 according to the first embodiment and includes an access unit 522 in place of the access unit 22. In addition, the mobile terminal 520 includes a driver acquisition unit 536 in place of the driver acquisition unit 36 of the mobile terminal 20 according to the first embodiment.

As described above, in the fifth embodiment, the device driver including the 3 modules is used. Therefore, the driver acquisition unit 536 acquires, from the device driver distribution server 52, an information file extended as follows, for example. In addition, in the same way as the JavaScript part 30A and the Java part 30B, the driver acquisition unit 536 downloads a file of a C language part 30C, based on information of c_driver.

{"java_driver": "driver.jar", "java_driver_class": "com.fujitsu.jp.driver.BloodPressure",
"js_driver": "driver.js",
"c_driver":"driver.lib" }

In the same way as the loading unit 21 according to the first embodiment, the loading unit 521 loads the Java part 30B of the device driver 30 stored in the driver storage unit 37 and imports the JavaScript part 30A. In addition, the loading unit 521 loads the C language part 30C of the device driver 30 stored in the driver storage unit 37. Furthermore, at a time of loading the C language part 30C, the loading unit 521 acquires and stores the API information of the C language part 30C, in an API table 525. In the same way as acquisition of the API information of the Java part 30B in the first embodiment, it is possible to acquire the API information of the C language part 30C. The API table 525 includes such a table illustrated in FIG. 6, in which the API information of the Java part 30B is stored, and a table in which the API information of the C language part 30C having the same format is stored. The API information of the Java part 30B includes API information for calling the C language part 30C.

Based on a general-purpose API received from the JavaScript part 30A and the API information of the Java part 30B of the API table 525, the access unit 522 calls an API of the Java part 30B. The Java part 30B delivers the called API to the access unit 522. Based on the API received from the Java part 30B and the API information of the C language part 30C of the API table 525, the access unit 522 calls an API of the C language part 30C. In accordance with the called API, the C language part 30C notifies the device information exchange unit 38 of information for controlling the peripheral device 50.

The mobile terminal 520 may be realized by, for example, the computer 60 illustrated in FIG. 7. In the storage unit 63 in the computer 60, an information processing program 570 for causing the computer 60 to function as the mobile terminal 520 is stored. The CPU 61 reads and deploys the information processing program 570 from the storage unit 63 and in the memory 62 and sequentially executes processes included in the information processing program 570. The information processing program 570 includes a loading process 571, an access process 572, and the information processing process 80.

The CPU 61 executes the loading process 571, thereby operating as the loading unit 521 illustrated in FIG. 16. In addition, the CPU 61 executes the access process 572, thereby operating as the access unit 522 illustrated in FIG. 16. The other processes are the same as those of the information processing program 70 in the first embodiment. From this, the computer 60 that executes the information processing program 570 turns out to function as the mobile terminal 520.

Next, operations of the information processing system 510 according to the fifth embodiment will be described. In the fifth embodiment, an information processing routine illustrated in FIG. 17 is executed in the mobile terminal 520. Note that, in the information processing routine in the fifth embodiment, the same symbol is assigned to the same processing operation as that of the information processing routine (FIG. 8) according to the first embodiment and the detailed description thereof will be omitted.

In step S511 subsequent to step S14, the loading unit 521 loads the Java part 30B and acquires and stores the API Information of the Java part 30B, in the API table 525. In addition, the loading unit 521 loads the C language part 30C and acquires and stores the API information of the C language part 30C, in the API table 525.

Next, in subsequent step S512 after steps S16 to S19, the access unit 522 calls the API of the Java part 30B, based on a general-purpose API and the API table 525. Next, in step S513, based on the API called from the Java part 30B and the API information of the C language part 30C of the API table 525, the access unit 522 calls the API of the C language part 30C. In addition, in accordance with the called API, the C language part 30C notifies the device information exchange unit 38 of information for controlling the peripheral device 50.

Next, in step S21, the device information exchange unit 38 accesses the peripheral device 50. Next, in step S514, the device information exchange unit 38 replies to the API called from the C language part 30C, with information acquired from the peripheral device 50. Next, in step S515, the C language part 30C replies to the API called from the Java part 30B, with information acquired from the peripheral device 50. After that, in the same way as in the first embodiment, the processing operations in steps S23 to S25 are performed, and the information processing routine finishes.

As described above, according to the information processing system 510 related to the fifth embodiment, in a case where the OS mounted in the mobile terminal 520 is able to use native languages, a device driver including modules described by using various types of native language is used. From this, a program, which is described by using, for example, the C language and whose operation is faster than that of a program described by using the Java, is used, thereby enabling to speed up processing of a device driver. In addition, it is possible to divert, to the C language part 30C of the device driver, a device driver described by using, for example, the previously developed C language, and it is possible to make development of the device driver efficient.

Note that in each of the above-mentioned embodiments, a case where the first module is defined as a module described by using the JavaScript and the second module is defined as a module described by using the Java is mainly explained. In addition, in the fifth embodiment, a case where the third module is defined as a module described by using the C language is explained. However, the individual modules are not limited to a case of being described by using these languages. The first module only has to be a module described by using a language recognizable by an application, and each of the second module and the third module only has to be described by using a language recognizable by a peripheral device or an OS to control the peripheral device. In particular, the first module is described by using a web technology, and each of the second module and the third module is described by using a native language, thereby being able to be applied to a hybrid app. From this, a web technology having a large number of developers is available, and a device driver of a previously developed native language is able to be utilized.

Note that, in the above-mentioned embodiments, modes in which the respective information processing programs are preliminarily stored (installed) in the storage unit 63 are described, there is no limitation thereto. A program according to the disclosed technology may be provided in a form of being recorded in a recording medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and the processor configured to:
execute an application software,
execute a specific process for coordinating a software module described in a first language with a software module described in a second language that is different from the first language, and
perform loading of a device driver for using a peripheral device, the device driver including a first software module described in the first language and a second software module described in the second language, the first software module being a software module in which a first plurality of interfaces are defined, the second software module being a software module in which a second plurality of interfaces are defined, in response to the loading, generate interface information for associating the first plurality of interfaces with the second plurality of interfaces respectively,
wherein for using the peripheral device,
the application software is configured to make a first access to a first interface selected from the first plurality of first interfaces,
the first software module is configured to make a second access to the specific process based on the first access,
the specific process is configured to make, on the basis of the second access and the generated interface information, a third access to a second interface selected from the second plurality of interfaces, the second interface being associated with the selected first interface, and
the second software module is configured to make a fourth access to the peripheral device based on the third access.

2. The information processing device according to claim 1, wherein in response to detecting the peripheral device, the first software module is selected from a first plurality of software modules and the second software module is selected from a second plurality of software modules.

3. The information processing device according to claim 1, wherein
a specific interface is defined in the specific process,
the specific process is configured to detect information in the second access made to the specific interface, and select the second interface from the second plurality of interfaces based on the information.

4. The information processing device according to claim 1, wherein
a first language is based on a web technology, and the second language is a native language.

5. The information processing device according to claim 2, wherein
the processor is configured to receive the first software module and the second software module from a server via a network.

6. The information processing device according to claim 4, wherein
the web technology includes at least one of hypertext markup language (HTML), JavaScript, and cascading stylesheets (CSS).

7. The information processing device according to claim 4, wherein the native language includes at least one of Java and C language.

8. The information processing device according to claim 4, wherein
the first software module and the second software module is comprised by a hybrid application.

9. An information processing method comprising:
executing an application software;
executing a specific process for coordinating a software module described in a first language with a software module described in a second language that is different from the first language; and
loading a device driver for using a peripheral device, the device driver including a first software module described in the first language and a second software module described in the second language, the first software module being a software module in which a first plurality of interfaces are defined, the second software module being a software module in which a second plurality of interfaces are defined, in response to the loading, generate interface information for associating the first plurality of interfaces with the second plurality of interfaces respectively,
wherein for using the peripheral device,
the application software is configured to make a first access to a first interface selected from the first plurality of interfaces,
the first software module is configured to make a second access to the specific process based on the first access,
the specific process is configured to make, on the basis of the second access and the generated interface information, a third access to a second interface selected from the second plurality of interfaces, the second interface being associated with the selected first interface, and
the second software module is configured to make a fourth access to the peripheral device based on the third access.

10. A non-transitory computer readable storage medium that stores a program that causes a computer to execute a process comprising:
executing an application software;
loading a device driver for using a peripheral device, the device driver including a first software module described in a first language and a second software module described in a second language different from the first language, the first software module having a first plurality of first interfaces are defined, the second software module having a second plurality of interfaces;
in response to the loading, generating interface information for connecting each of the first plurality of interfaces to each of the second plurality of interfaces; and
when the application software executes an access from a first interface included in the first plurality of interfaces to a second interface included in the second plurality of interfaces, the second interface being selected from the second plurality of interfaces on the basis of the generated interface information.

11. The non-transitory computer readable storage medium according to claim 10, the process further comprising:
loading another device driver for using another peripheral device, the other device driver including a third software module described in the first language and a fourth software module described in the second language, the third software module having a third plurality of interfaces, the fourth software module having a fourth plurality of interfaces; and in response to the loading of the other device driver, generating other interface information for connecting each of the third plurality of interfaces to each of the fourth plurality of interfaces.

\* \* \* \* \*